United States Patent
Volpato et al.

(10) Patent No.: US 12,370,509 B2
(45) Date of Patent: Jul. 29, 2025

(54) INJECTOR DEVICE FOR AN APPARATUS SUITABLE FOR MIXING CHEMICALLY REACTIVE COMPONENTS

(71) Applicant: AFROS S.P.A., Milan (IT)

(72) Inventors: Marco Volpato, Milan (IT); Maurizio Corti, Milan (IT); Luca Campi, Milan (IT); Giorgio Molteni, Milan (IT); Samuele Zampini, Milan (IT); Pierangelo Olivieri, Milan (IT)

(73) Assignee: AFROS S.P.A. (IT)

( * ) Notice: Subject to any disclaimer, the term of this patent is extended or adjusted under 35 U.S.C. 154(b) by 712 days.

(21) Appl. No.: 17/741,007

(22) Filed: May 10, 2022

(65) Prior Publication Data

US 2022/0362724 A1    Nov. 17, 2022

(30) Foreign Application Priority Data

May 11, 2021    (IT) .......................... 102021000012113

(51) Int. Cl.
*B01F 25/312*    (2022.01)
*B01F 25/00*    (2022.01)
(Continued)

(52) U.S. Cl.
CPC .... *B01F 25/312521* (2022.01); *B01F 25/105* (2022.01); *B01F 25/31243* (2022.01);
(Continued)

(58) Field of Classification Search
CPC ..... B29B 7/488; B29B 7/7684; B29B 7/7689; B29B 7/7694; B29B 7/80; B29B 7/7631;
(Continued)

(56) References Cited

U.S. PATENT DOCUMENTS

| 4,671,942 A | 6/1987 | Dietachmair |
| 5,093,084 A * | 3/1992 | Boden .................. B29B 7/7663 366/175.2 |

(Continued)

FOREIGN PATENT DOCUMENTS

| DE | 3940866 A1 | 6/1991 |
| EP | 219167 A * | 4/1987 ........... B29B 7/7615 |

(Continued)

*Primary Examiner* — Charles Cooley
(74) *Attorney, Agent, or Firm* — LAUBSCHER & FRETWELL, P.C.

(57) ABSTRACT

An injector device for supplying a chemically reactive component to a mixing head includes a modular structure defined by a hollow housing and guiding body extending around a longitudinal symmetry axis and having one or more supply openings for supplying the chemically reactive component; in the hollow body a nozzle orifice is obtained arranged to face and communicate with a mixing chamber obtained in the mixing head; a pin-shaped partialization and control element, which is housed and slidably movable—along the longitudinal symmetry axis—in the hollow body and configured to vary a narrowed active section of the nozzle orifice; on the partialization and control element a tip portion is obtained that is conformed to receive pressure from the respective polymer component delivered to said hollow body so as to move away said partialization and control element from said nozzle orifice to vary the area of said narrowed active section; a modular adjusting and contrasting unit, which is removably couplable with the hollow body and with the partialization and control element and configured to exert an axisymmetric thrust action on the partialization and control element to arrange the partialization and control element in an initial position and preload condition to adapt the narrowed active section to a reference flowrate and pressure of the polymer component and subsequently to vary the position of said partialization and (Continued)

control element to adjust the narrowed active section according to the flowrate variation, exerting the contrasting force that is suitable for balancing the pressure exerted by the polymer component; the modular adjusting and contrasting unit includes a series of interchangeable elastic elements of conical disc shape, configured to exert a non-linear elastic action that is such as to contain the retracting stroke of the partialization and control element, limiting as much as possible the pressure variation at the variation of the flowrate of the respective polymer component entering the hollow housing and guiding body; the modular adjusting and contrasting unit, the tip portion and the nozzle orifice cooperate mutually to confer to the injector device a geometric conformation with high section gain, corresponding to a high ratio between the variation of the area of narrowed active section and the longitudinal shift of the partialization and control element.

39 Claims, 19 Drawing Sheets

(51) Int. Cl.
  *B01F 101/00* (2022.01)
  *B29B 7/76* (2006.01)

(52) U.S. Cl.
  CPC .............. *B01F 25/312511* (2022.01); *B01F 25/312522* (2022.01); *B29B 7/7636* (2013.01); *B29B 7/7663* (2013.01); *B01F 2101/2204* (2022.01); *B01F 2215/0422* (2013.01)

(58) Field of Classification Search
  CPC ........... B29B 7/244; B29B 7/005; B29B 7/28; B29B 7/7404; B29B 7/801; B29B 7/90; B29B 7/726; B29B 7/728; B29B 7/7615; B29B 7/7657; F16J 15/0887; F16J 15/46; F16J 15/545; B01F 2035/351; B01F 35/00; B01F 25/312521; B01F 25/105; B01F 25/31243; B01F 25/312511; B01F 25/312522; B01F 2101/2204; B01F 2215/0422; B01F 25/20; B01F 35/7174; B01F 25/30; B01F 25/314; B01F 25/431952; B01F 35/2213; B01F 2025/916; B01F 2025/91913; B29C 43/52; B29C 2043/028; B29C 43/36; B29C 43/027; B29C 67/246; B29C 44/3442; B29C 44/60; B29K 2027/16; B29K 2027/18; B29L 2031/26; B29L 2031/265; B05B 1/3006; B05B 1/3046; B05B 1/34; B05B 12/087
  USPC ......... 366/162.4, 162.5, 167.1, 173.1, 159.1; 422/131, 133–135
  See application file for complete search history.

(56) References Cited

U.S. PATENT DOCUMENTS

| | | | |
|---|---|---|---|
| 6,592,249 B1 | 7/2003 | Hausbichlier et al. | |
| 7,455,446 B2 * | 11/2008 | Corti | B29B 7/7694 |
| | | | 422/133 |
| 7,614,780 B2 * | 11/2009 | Corti | B29B 7/7642 |
| | | | 422/133 |
| 9,308,512 B2 * | 4/2016 | Fiorentini | B29C 67/246 |
| 9,731,267 B2 * | 8/2017 | Fiorentini | B29B 7/80 |
| 10,717,092 B2 * | 7/2020 | Songbe | B05B 1/3405 |
| 2002/0176907 A1 | 11/2002 | Sochtig | |
| 2015/0055434 A1 | 2/2015 | Mader | |

FOREIGN PATENT DOCUMENTS

| | | | | |
|---|---|---|---|---|
| EP | 271803 A | * | 6/1988 | ........... B29B 7/7684 |
| EP | 2023025 A2 | | 2/2009 | |
| GB | 2433904 A | | 1/2006 | |
| JP | 01316221 A | * | 12/1989 | ........... B29B 7/7684 |

* cited by examiner

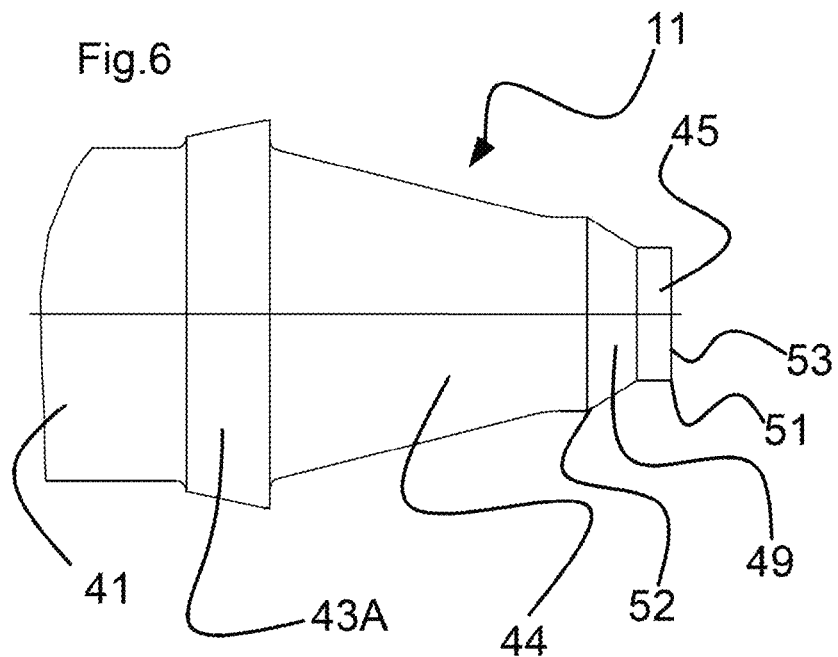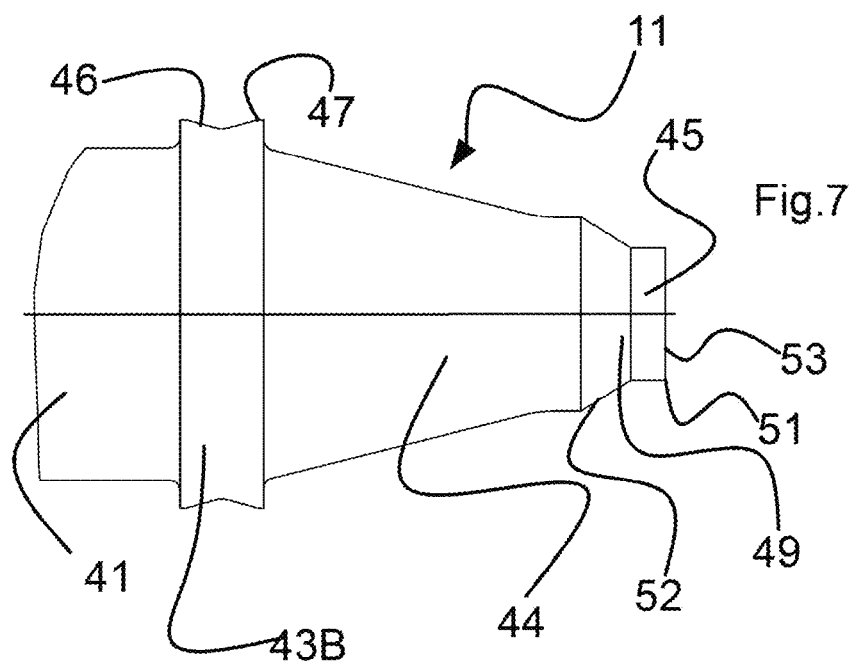

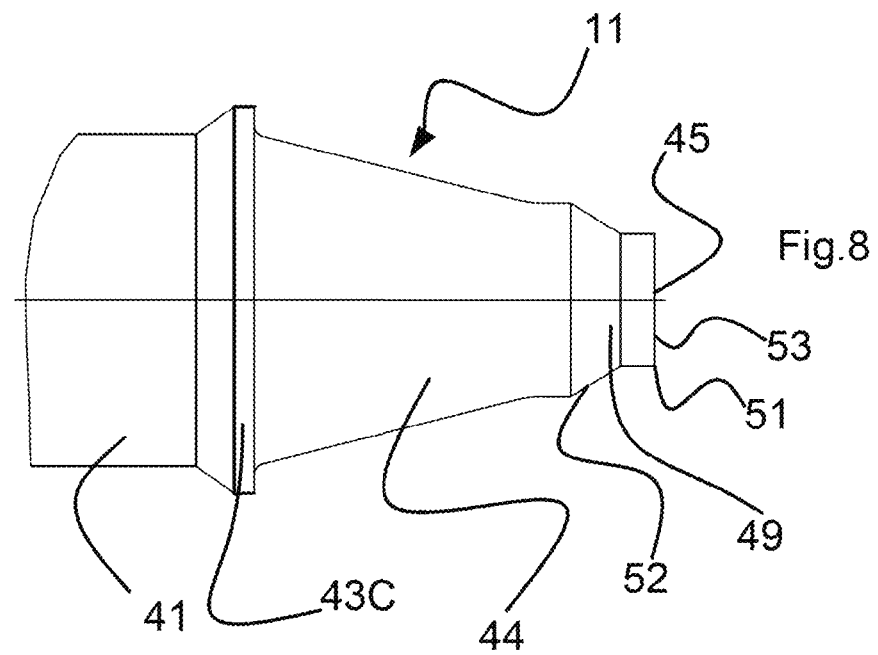
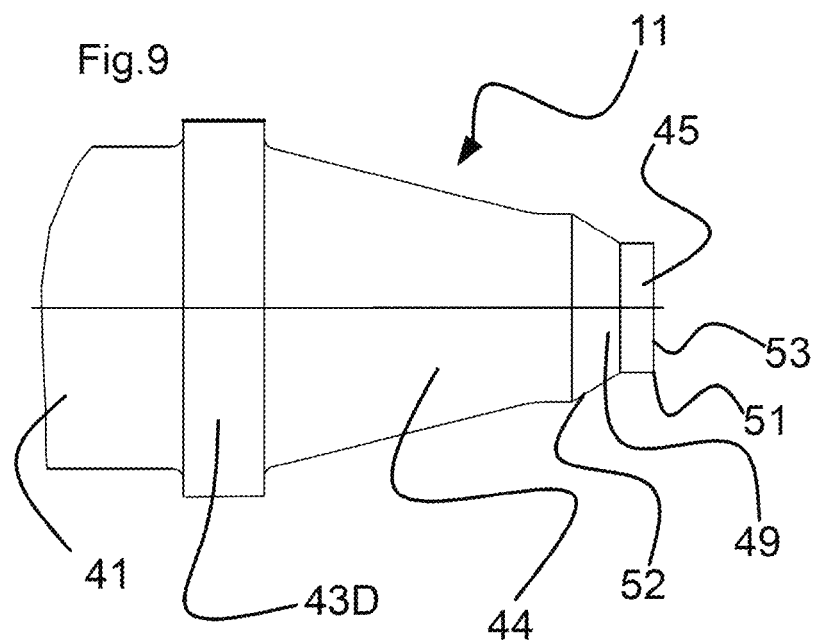

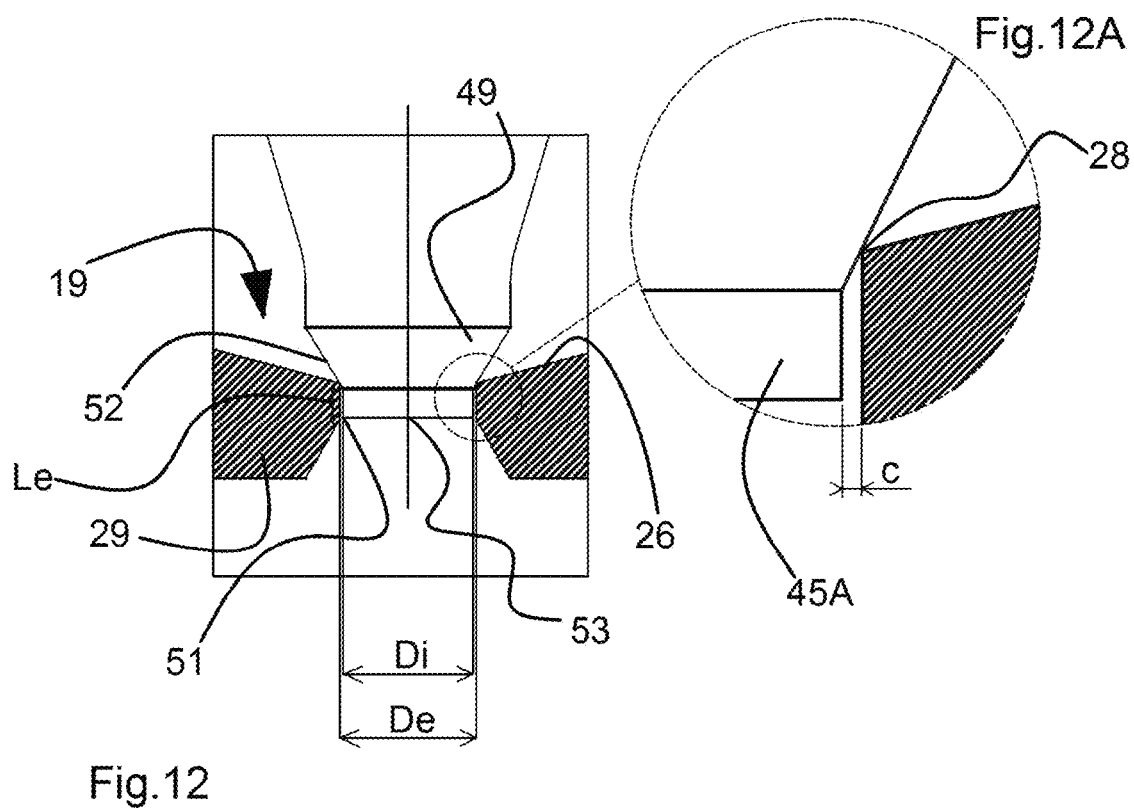

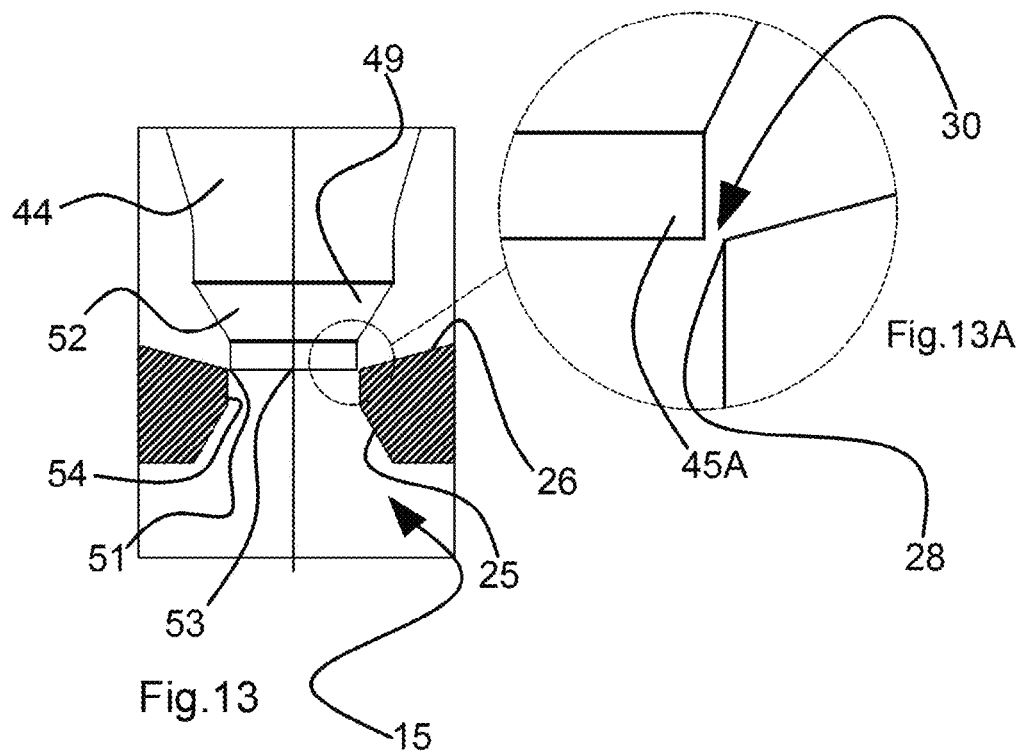
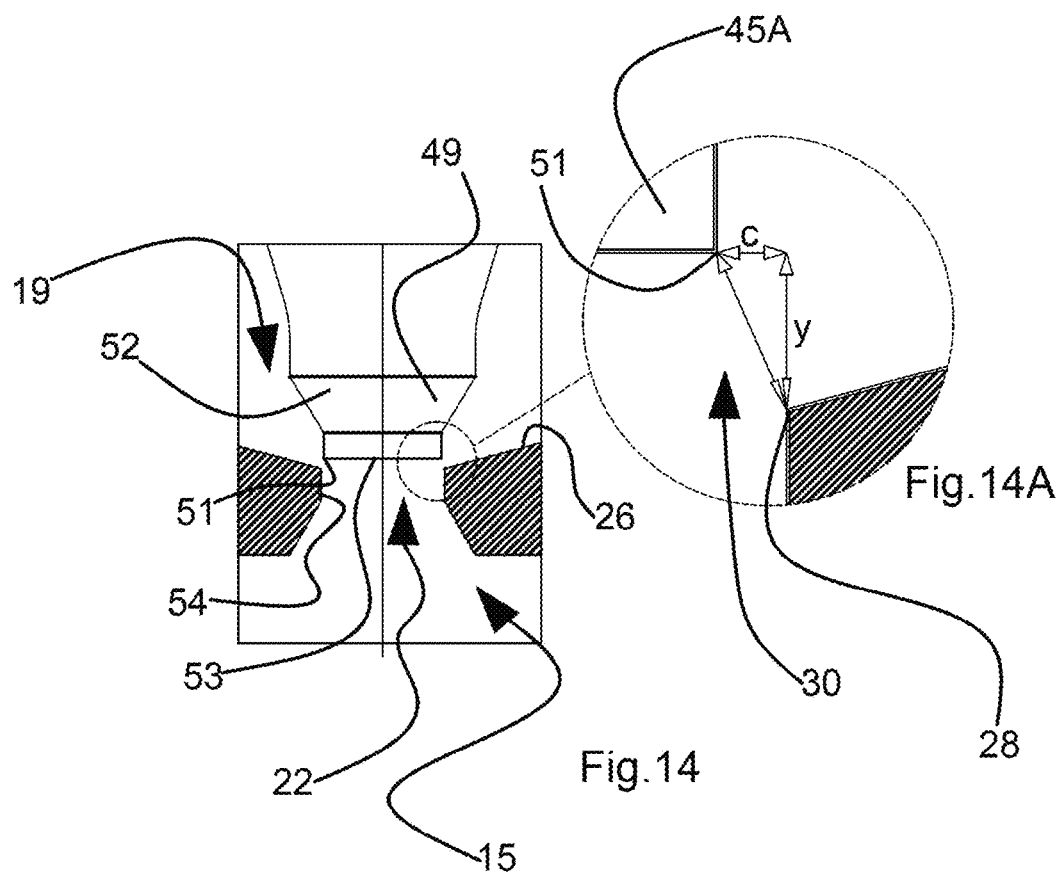

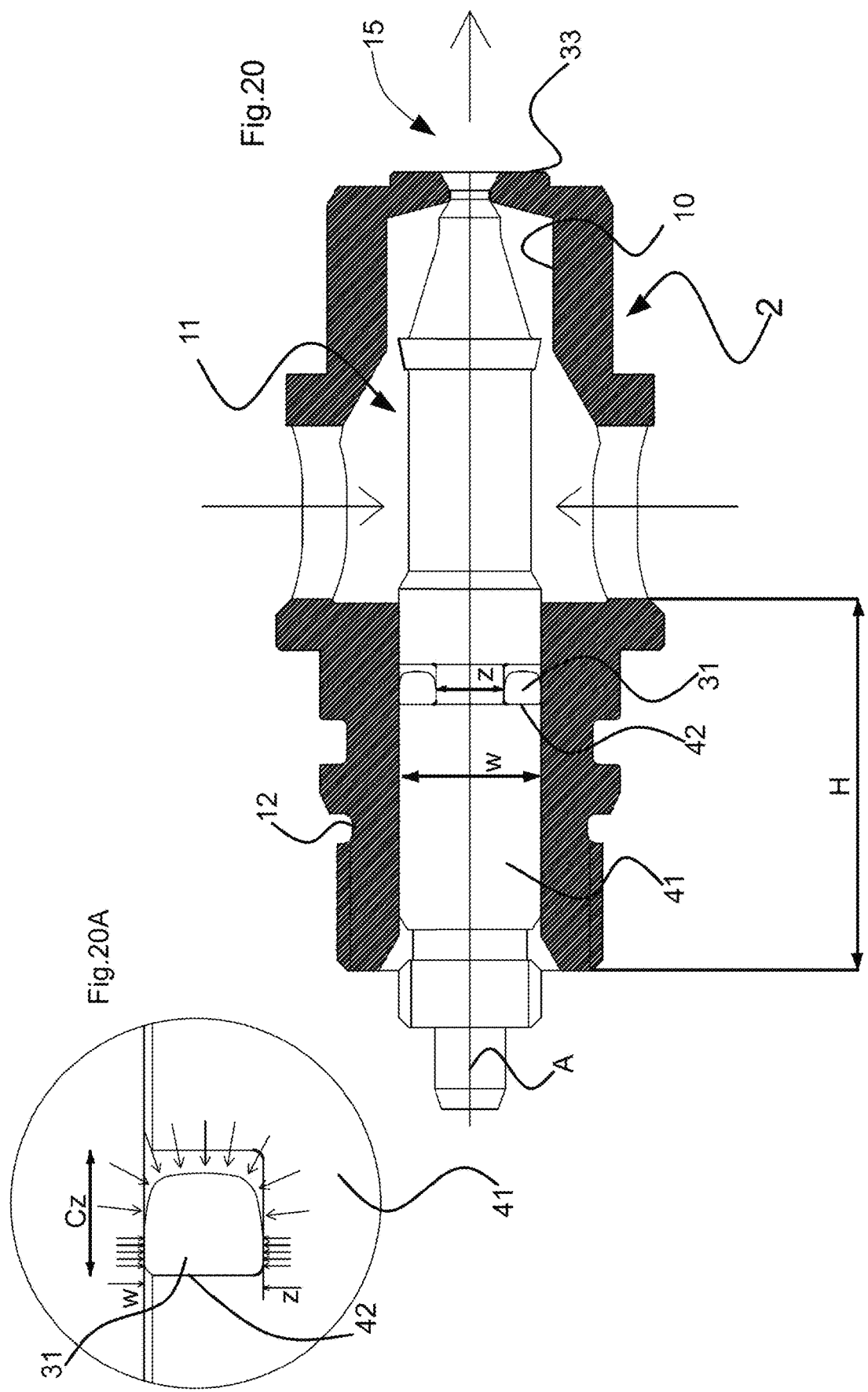

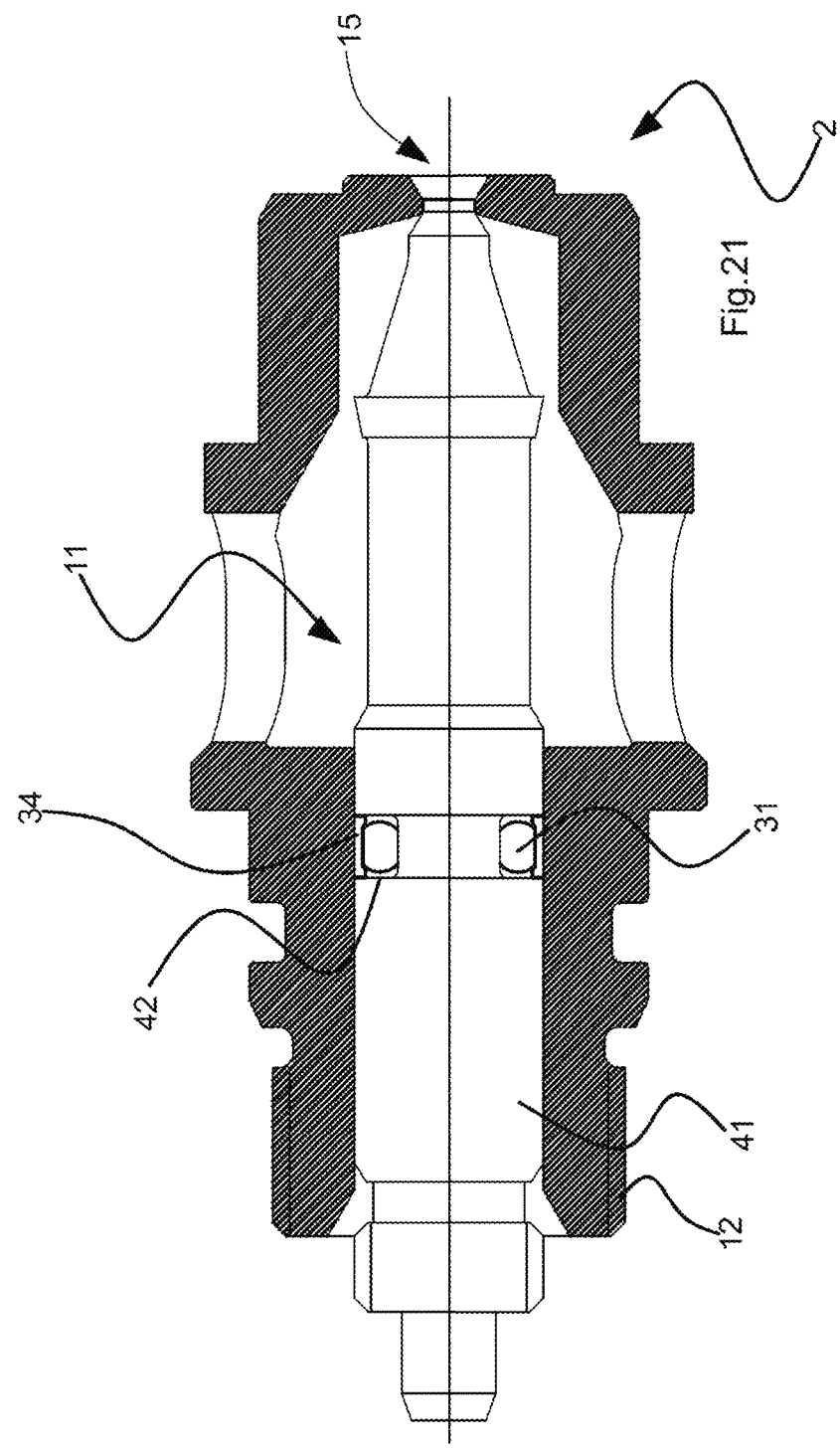

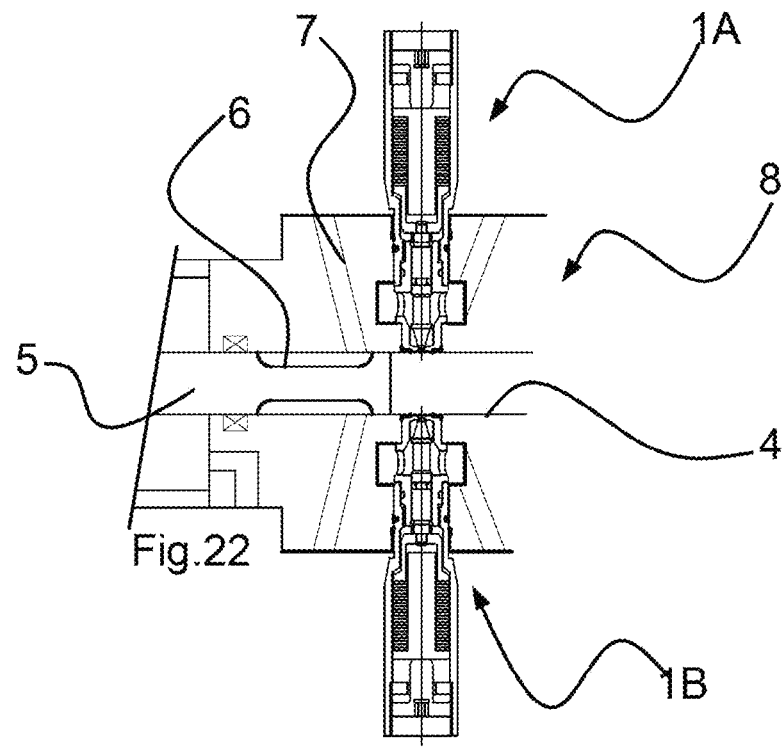
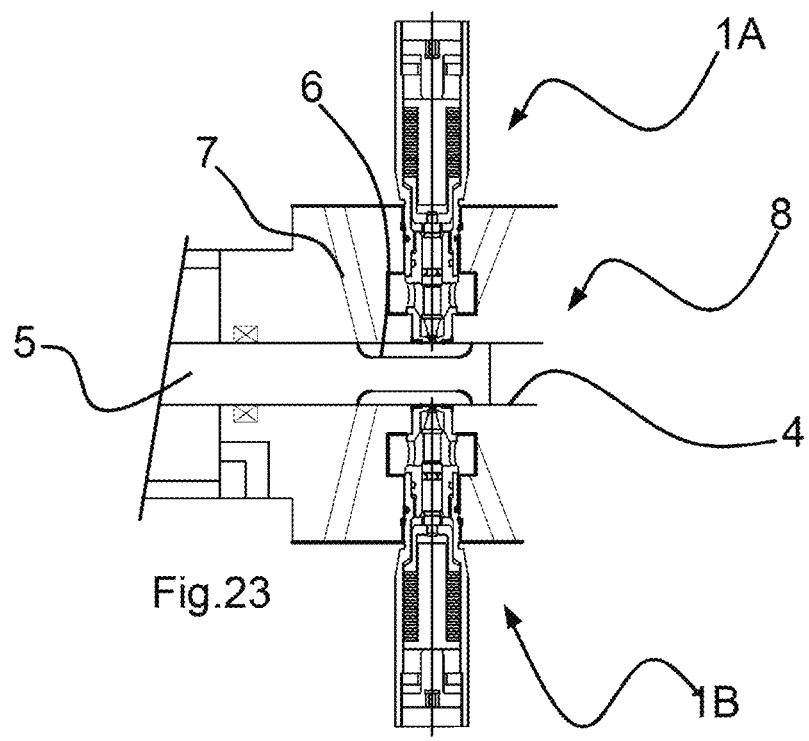

INJECTOR DEVICE FOR AN APPARATUS SUITABLE FOR MIXING CHEMICALLY REACTIVE COMPONENTS

CROSS-REFERENCE TO RELATED APPLICATIONS

This application claims priority from Italian Patent application No. 102021000012113 filed on May 11, 2021. The entire content of this application is incorporated herein by reference.

BACKGROUND OF THE INVENTION

The present invention relates to an injector device that is suitable for an apparatus for mixing by turbulence originated by jets and impingement and subsequent dispensing of chemically reactive components for forming or moulding various types of objects.

Mixing heads are known that are suitable for mixing reactive liquid components dosed in high pressure condition, including a mixing chamber into which two or more injectors lead. Each injector is supplied with one of the chemical components that have to be mixed thoroughly by the kinetic energy supplied by the jets originated by the injectors and by the turbulence that the jets develop in the mixing chamber in order to form a reactive mixture that is able to react inside a forming mould or another support. The obtained mixture flows through a dispensing conduit and is poured or injected inside the cavity of the forming mould.

Inside the mixing and guide chamber or conduit, a valve element or slide valve, that is provided with longitudinal slots for recirculating the polymer components when controlled in the advanced or closed position and for their mixing and final expulsion of the reactive mixture when controlled in the retracted or open position, slides. The slide valve is slidingly movable alternatively along the mixing and guide conduit obtained in the head. The slide valve is driven, at a rear end, by a hydraulic cylinder.

The aforesaid injectors face the inside of the mixing conduit, transversely to the longitudinal axis of the latter, so as to be able to generate jets inside said conduit known as mixing chamber and achieve the thoroughly mixing of the reactive resins.

In particular, the injectors are arranged according to respective axes that can be orthogonal to the aforesaid longitudinal axis of the mixing chamber and are radially opposite one another, or distributed along respective radial axes that are spaced angularly apart from one another along the circumference of the circular section of the mixing chamber, so as to induce jets converging on an impingement or collision zone between the jets towards a common focus point inside the mixing chamber.

Alternatively, the axes of the injectors can also be tilted so that the axis thereof lies on a plane that passes through the longitudinal axis of the mixing chamber. This axis can be tilted in relation to the direction that is orthogonal to the axis of said chamber, such that the injectors point in a direction that is opposite the outlet from the mixing chamber.

The aforesaid tilt is the same for the two or more injectors, can vary by more or less than 20 degrees and is such that the injectors direct the respective jets to the front part of the slide valve when in the retracted open position.

It is advisable for the efficacy of the mixing that the axes of the injectors are nevertheless directed to a common focal point located along the axis of the mixing chamber.

The injectors are devices configured to generate a hydraulic narrowing, which causes a pressure jump between the fluid vein upstream, in the supply conduit and consequently towards the pumps or other dosing devices, and the fluid vein downstream, beyond said narrowing in function of the flowrate that traverses the narrowing.

The injectors, in other words, transform the pressure energy of the liquid components supplied under pressure to said energy injectors in kinetic energy associated with the jets that exit the same injectors, which is generated by the narrowing and the corresponding pressure jump.

The injectors, for making the hydraulic narrowing, are provided with nozzles with an opening of circular section, which is appropriately partialized by a retractable partialization element known as a pin that is slidably movable axially within and opposite the aforesaid nozzle along the axis of said nozzle in the direction of origin of the flow.

The reciprocal position, along the common longitudinal axis between the pin and the nozzle, adjusts the hydraulic narrowing, that is the partialization of the narrowed section in the direction of the outlet from the nozzle. The reciprocal position between the pin and nozzle is set by the backward movement of the end section of the pin. This adjustment determines the amount of the pressure upstream of the injector in function of the flowrate that has to transit there so as to control the amount of the pressure energy of the jet that has to be transformed into kinetic energy and turbulence.

The intrinsic turbulence of the jet and the one arising from the impingement against the other jet or against a wall of the mixing chamber give rise to a mixing of the two chemical components, a so-called "high pressure mixing".

In high pressure (above 70 bar) mixing technology, two or more reactive liquid components are dosed in a respective stoichiometric ratio by specific servo-controlled dosing systems based on volumetric pump systems or using reciprocating pistons.

The pumps or other dosing systems have the task of generating the requested flowrates by maintaining the stoichiometric ratio between the reactive components in function of the total flowrate, whereas the injectors generate the hydraulic pressure jump necessary to generate the energy of the jets and accordingly the pressure upstream of the injectors themselves.

In the mixing of reactive liquid components by mixing heads, of the type cited above, there is the need to dose the reactive components in the reciprocal ratio and at the flowrate necessary for the process, whereas in order to obtain an optimum mixing it is necessary to adjust the section of the narrowing of each of the injectors at the respective nozzle, such that the components supplied at stoichiometrically controlled flowrates maintain the requested pressure upstream of the nozzle to supply the jets with the necessary energy and turbulence to obtain a thoroughly mixing.

That said, the main function requested of the injectors in question is that of adjusting appropriately the narrowed section that is formed at the nozzle by the pin, adjusting the position thereof for the different flowrates that can be dispensed by the dosing devices, which are commanded and controlled to dose the reactive resins upstream of the injectors regardless of the pressure that they have to provide and supply the reactive resins to the injectors themselves through the respective pipes and conduits connected to the mixing head.

In modern production processes, the flowrates are generally varied both between one mixing and dispensing step and the next and during the current mixing and dispensing step.

In particular, the dosing apparatuses operate to obtain an outlet flow from the mixing head, that is the total flowrate that can vary from one dispensing to the other, maintaining the stoichiometric ratio of the components by suitable control of the flowrates dosed to each injector. Lastly, also the stoichiometric ratio of the dispensed flowrates can be varied from one dispensing to the next to change the properties and reactivity of the dispensed reactive mixture.

In more recent known systems, the total flowrates are dispensed with total flowrates varied during the same dispensing step to obtain a better control of the distribution of the flows that exit from the mixing head to the cavity of the mould to which they are directed.

The known injectors with a cursor or movable partialization element known as a pin, in the simplest version, are provided with a positioning device that is manually settable, including an adjusting screw or another member that has the function of presetting the axial position of the pin in relation to the nozzle and, consequently, the position of the end section of the pin itself that determines the narrowed section between the pin and nozzle.

Usually, the operator sets the required flowrates to be dispensed through each injector, positions the slide valve in a closed recirculating position, enables the dispensing of the set flowrate, and thus adjusts the position of the pin so as to set the required pressure value, which is read by a pressure gauge or transducer.

The retraction of the pin with respect to the nozzle determines a greater transit section, so it decreases the pressure jump at the same flowrate. The pressure stabilizes at the value determined by the flowrate through the limited section that is thus adjusted.

Injectors are also known in which the movable partialization cursor or pin is free to slide in a cylindrical guide section. The cursor is pushed in the direction of greater narrowing or closure of the nozzle by a spring.

The position of the pin and thus of the narrowing and accordingly the pressure upstream of the nozzle is adjusted by a screw device that sets the preload of a thrust spring of coil type. As the pin is movable, during the steps in which the reactive component is not sent to the injector or is recirculated at low pressure, the pin is pushed by the spring against the nozzle until it closes the transit through the latter. During the steps of delivery of the dosed and pressurized liquid components to the injector, at which they arrive through specific conduits in the mixing head and through radial holes that deliver the flow upstream of the nozzle, the flow arrives at the coupling zone between the pin and nozzle and generates pressure in said zone upstream of the narrowed section. The pressure of the reactive component thus exerts a corresponding force on the sliding section of the partialization cursor or pin, which pushes the latter back in contrast with the force exerted by the spring, opening it when it is closed and increasing the narrowed section from which the flow of reactive resin passes. With this retracting movement, the narrowed section, that is useful for the transit of the fluid, increases (i.e. the effect of hydraulic narrowing tends to diminish) when the pressure upstream of the nozzle increases, with a subsequent increase of the deflection arrow and of the load of the springs.

The retraction of the end of the pin determines a greater (narrowed) transit section, so, at the same flowrate, the pressure jump decreases and thus the force that pushes the cursor in the retraction direction. The position of the pin stabilizes when the force of the pressurized liquid balances the elastic thrust force of the preloaded spring. The pressure stabilizes at the value determined by the flowrate through the narrowed section that is thus adjusted.

In this case, the injector is defined as being of the self-adjusting type, because an increase in flowrate compared with the balance situation determines a pressure increase that pushes the pin against the spring, causing retraction thereof and increasing the transit section on the nozzle.

An increase of the pressure upstream of the narrowed transit section is necessary to generate the retraction. For this reason, the injector is defined as being of self-adjusting type and adapts to an increase or decrease of the flowrate that traverses the injector itself, modifying the position between the pin and nozzle as the pressure upstream of the pin varies.

The pressure variation operated by the injector—arising from a flowrate variation—nevertheless involves a variation of the kinetic energy transferred to the jet generated by the injector, from which a variation of the mixing quality between the resins arises.

Furthermore, the pressure variation induces phenomena of elastic accumulation of fluid in the volume occupied by the liquid component contained between the pump or another dosing device and the injector; this elastic accumulation arises from the compressibility of the liquid reactive component and from the elasticity of the pipes that contain the latter it (above all those of the flexible type) and that supply it to the mixing head and thus to the injector, causing transitory accumulation phenomena during which the stoichiometric ratio of the liquids that reach the head is affected by transitory variations, which are proportional to the size of the accumulation of volume of reactive resin in the pipes between the dosage device and the injector itself.

Currently, in the controlled industrial processes with high automation, precise performances in terms of repetitivity of the production cycles are increasingly required in order to ensure determined qualitative levels in the production of various objects; for this reason, the monitoring and control systems of the production quality consider variations of supply pressure to the injectors to be outside tolerance if the variations exceed determined acceptability thresholds, with a consequent occurrence of operating problems and slow-downs of the production process.

Furthermore, in the injectors of self-adjusting type described above, hysteresis phenomena occur that affect the contrasting springs of coil type, and friction due to the hydraulic seals that oppose the sliding of the pin and cause a jerky and/or irregular movement of said pin cursor. These disturbances immediately affect the pressures upstream of the injector, causing further problems of repetitivity of the mixing and dispensing process.

In order to overcome these problems, other types of adjustment of the position of the frontal section of the pin with respect to the nozzle have been developed and are known, which are defined as being of active type. The latter are actuated with systems for positioning the pin and contrasting the force that the pressure of the respective reactive component exerts thereupon via pneumatic or hydraulic pistons, or diaphragms or bellows actuated by the pneumatic or hydraulic pressure of an operating fluid, or by electro-mechanical drives or other combined systems arranged to vary for example the preload on the spring or directly the position of the pin in function of the pressure detected upstream of the nozzle.

Despite this, these active systems are not free of further problems: they are complex mechanically, more bulky and costly, they require connections with the drive systems, which are located, by necessity, in zones far from the mixing head. They are also markedly affected by the problems arising from the hysteresis of the presetting and operating forces, acting on the sliding, and from the force on the cursor/pin, moreover they tend to amplify the friction effect, in particular the friction effect of first detachment, which induces sudden jerks in the movement that adversely affect the adjusted pressure and thus the quality of mixing and dispensing. They are also markedly affected by the disturbances generated by possible residues of resin or dirt that accumulate inside the injectors; accordingly, they are difficult to stabilize and require thorough and costly periodic maintenance.

Such systems are in particular affected—like the self-adjusting spring injectors of known type—by the discontinuity caused by the friction of the seals that have to be necessarily fitted to the coupling of the guide and sliding system of the pin to prevent the reactive resins from passing along the coupling of the sliding section and exiting the injector.

In some known devices, systems are also provided for collecting the leak fraction of the leaking reactive components and which enable the seals not to be fitted to prevent the friction effects. Nevertheless, it is equally known that one of the reactive resins—isocyanate—is classified as harmful to health and reacts with the atmospheric humidity, creating solid crystals and thus requiring frequent, expensive and inconvenient maintenance and cleaning interventions. For this reason, the sliding section of the pin is provided with anti-leak seals.

In the light of what has just been described, there is still ample room for improvement of systems for mixing and dispensing reactive resins to a mould or another support, and the need is thus felt to identify solutions to overcome the limits and drawbacks inherent in the known systems described above.

One object of the present invention is to improve the current high-pressure mixing and dispensing apparatuses.

Another object of the present invention is to provide a solution for the injecting-mixing of reactive components that is advantageous under the structural profile and is versatile from the operational point of view.

In particular, one object of the invention is to provide an injector device of enhanced self-adjusting type, and correspondingly a mixing head provided with at least two of these injector devices, that is able to permit a dispensing of reactive polymeric mixture—into a mould or on another support—with the possibility of varying the flowrates of the resins, or chemically reactive components, both in the course of the same dispensing step and during sequential dispensing, obtaining mixing pressure variations upstream of the nozzle around the setting value that are very small and repeatable.

Another object of the present invention is to provide an injector device that is able to minimize as far as cancelling completely the disturbances linked to sliding friction and friction of first detachment between the hydraulic seals that are due to the reciprocal internal movements between the components of the injector device, with particular reference to the sliding of the pin element.

Another object of the present invention is to implement a mixing apparatus including an injector device of the passive self-adjusting type the passive type control of which is able to ensure an effective and correct preload function and at the same time set the most suitable elastic stiffness for the system.

Another object of the present invention is to provide a mixing apparatus provided with injector devices that is able to achieve effective mixing by turbulence of the jets of reactive components.

Another object of the present invention is to provide a self-adjusting injector device, and corresponding mixing system having a geometric-structural configuration that is such as to optimize the coaxiality and symmetry of the jets of reactive components exiting the injector devices, so as to make the reactive components converge on a common focal point, such that the thoroughly mixing of the aforesaid reactive components is promoted and favoured.

Another object of the present invention is to provide a self-adjusting injector device, and corresponding mixing system having a geometric configuration of the pin-nozzle coupling and end part of the pin—nozzle that optimizes the convergence of the flow and the flowrate gain in function of the variation of displacement of the pin and of variation of the pressure upstream of the narrowed section, generating high energy jets and perfect coaxiality as the flowrates vary.

A further object of the invention is to implement a self-adjusting injector device consisting of a narrowing modular section of the narrowed active transit section from the nozzle and of a passive command and adjusting section of the size of the hydraulic narrowing of said narrowed partialization section, geometrically configured so as to generate also an increase in the pressure value of the reactive component measured at the inlet of the supply channel of the head as the nominal presetting flowrate that traverses the nozzle diminishes.

SUMMARY OF THE INVENTION

These objects and further advantages are achieved by an injector device as defined in the attached claims.

The injector device according to the invention allows to overcome the set out above limits of the prior art devices to be overcome and to achieve the set objects.

In particular, owing to the invention, an injector device is supplied of passive self-adjusting type with modular structure, configured to make jets that are axisymmetric and directed axially, which are adaptable in a very versatile manner to specific operating conditions, to the features of the chemically reactive components and to the features of the mixing head with which to couple.

The injector device is geometrically configured to operate with a great gain of section, minimizes the friction to which the partialization and control element (pin element) is subjected, allows an effective mixing action by turbulence and, also owing to the specific adjusting and control unit with conical discoid elastic elements, contains to a maximum the pressure variations associated with the variations of flowrates of the polymer component.

BRIEF DESCRIPTION OF THE DRAWINGS

FIGS. 6 to 9 show a portion of the partialization and control element (pin element) according to various possible embodiments;

FIGS. 12 and 12A show a detail of the injection module, in particular a portion of the nozzle orifice and of the end portion of the partialization and control element coupled therewith in a closed position;

FIGS. 13 and 13A and 14 and 14A are other views of the nozzle orifice and of the end portion of the pin element in adjusting positions;

FIGS. 17 and 17A show in detail a portion of the injection module, in particular the zone near a turbulator ridge obtained on the pin element;

FIGS. 20 and 20A shows in detail a seal element placed between pin element and a guide and housing hollow body;

FIG. 21 shows an alternative embodiment of the seal element between pin element and a guide and housing hollow body;

FIGS. 22 and 23 show the mixing chamber in which the injector devices according to the invention are inserted according to two different operating positions;

DETAILED DESCRIPTION

Figure 1:
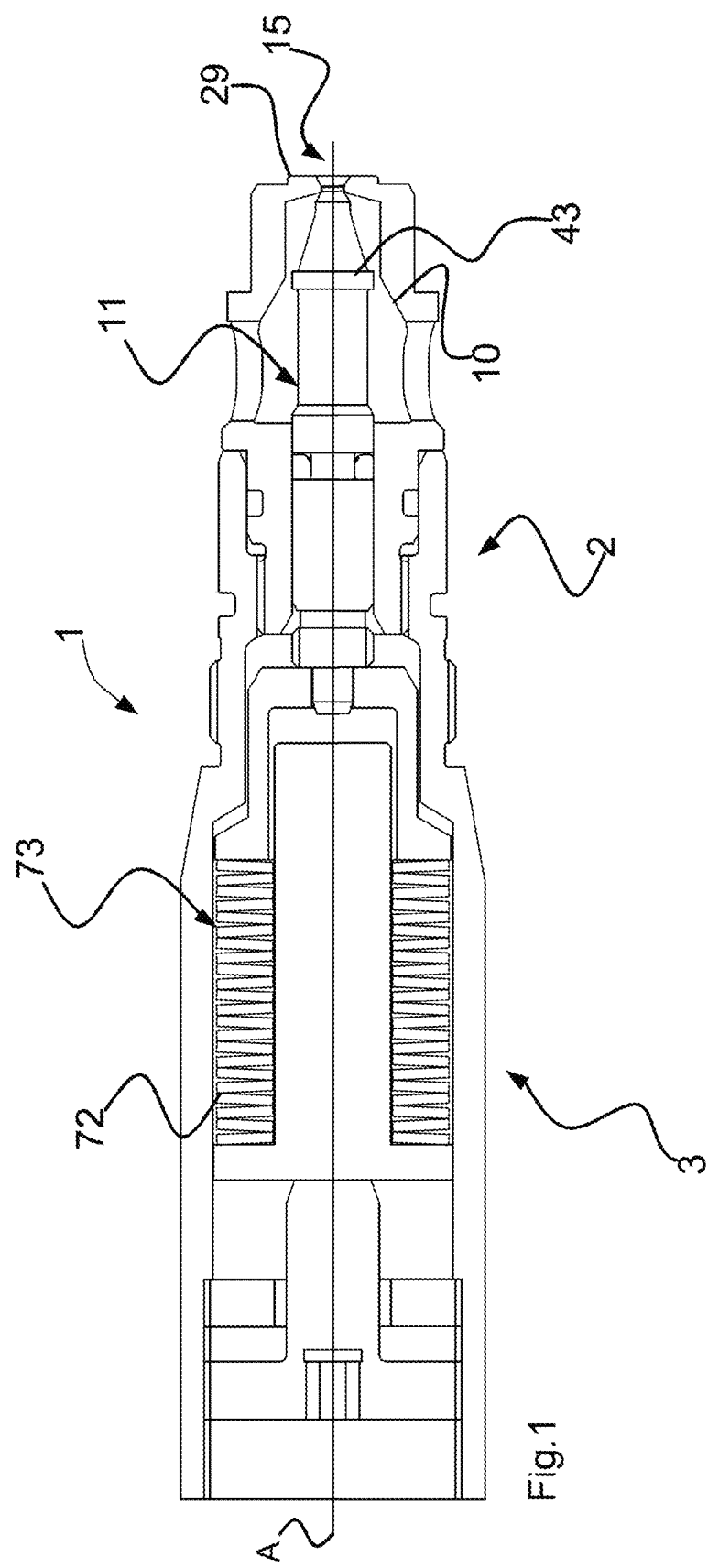
FIG. 1 shows an injector device according to the invention, having a modular structure consisting of an injection module and an adjusting and control unit that are coupled together.

With reference to the attached Figures, an injector device 1 is disclosed for mixing and dispensing chemically reactive components for forming or moulding by reaction objects of different type. The modular injector device 1 consists of two independent units 2, 3 coupled together: a modular injection unit or injection module 2 including a variable hydraulic transit narrowing or active narrowed transit section 30 and of a modular adjusting unit 3 of the size of the hydraulic narrowing 30, configured to adjust the pressure of the afferent liquid upstream of the active narrowed transit section 30 and to self-adjust passively to the flowrate variations of the chemically reactive liquid components delivered to the injector device 1.

Figure 2:
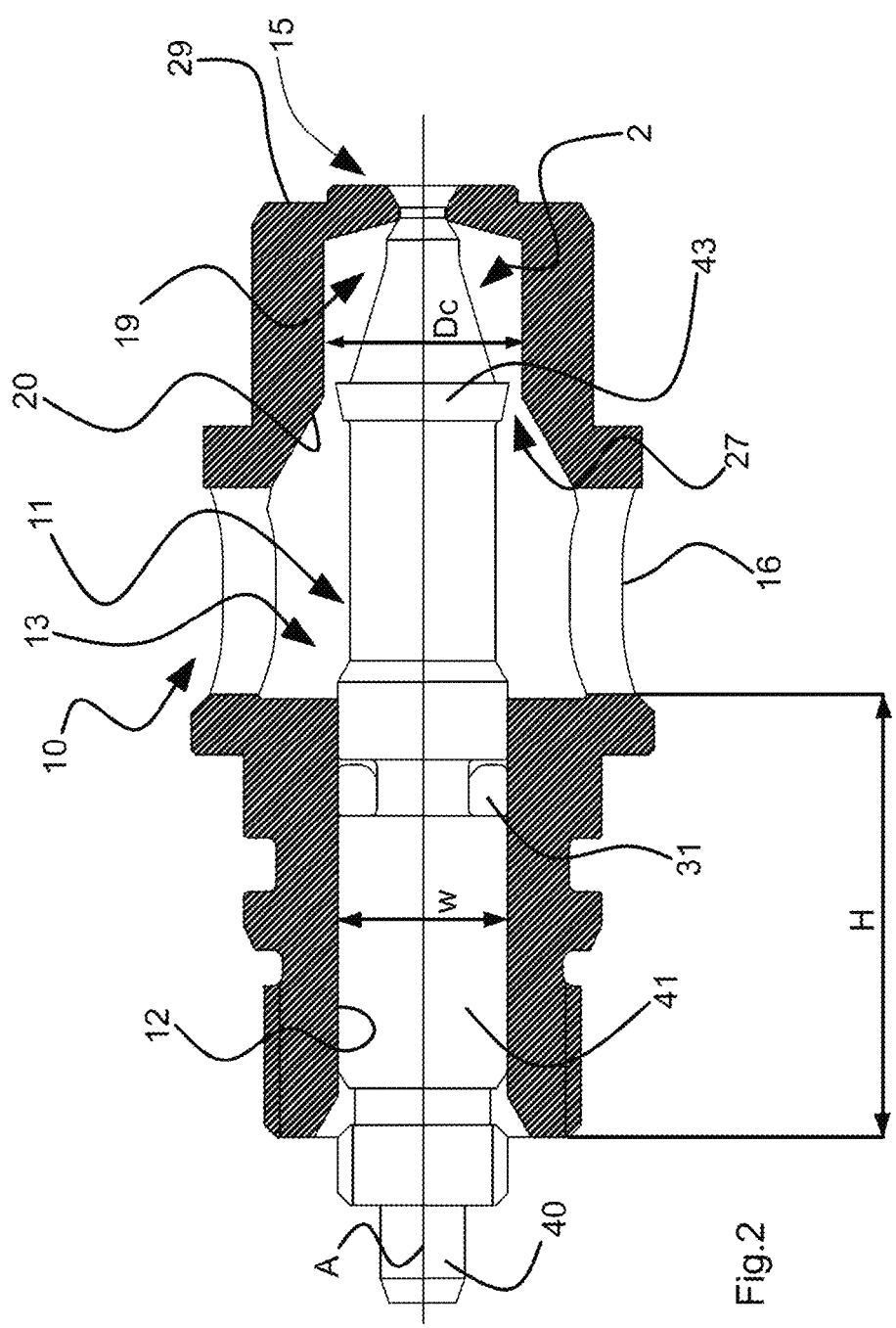
FIG. 2 shows only the injection module of the injector device.
Figure 3:
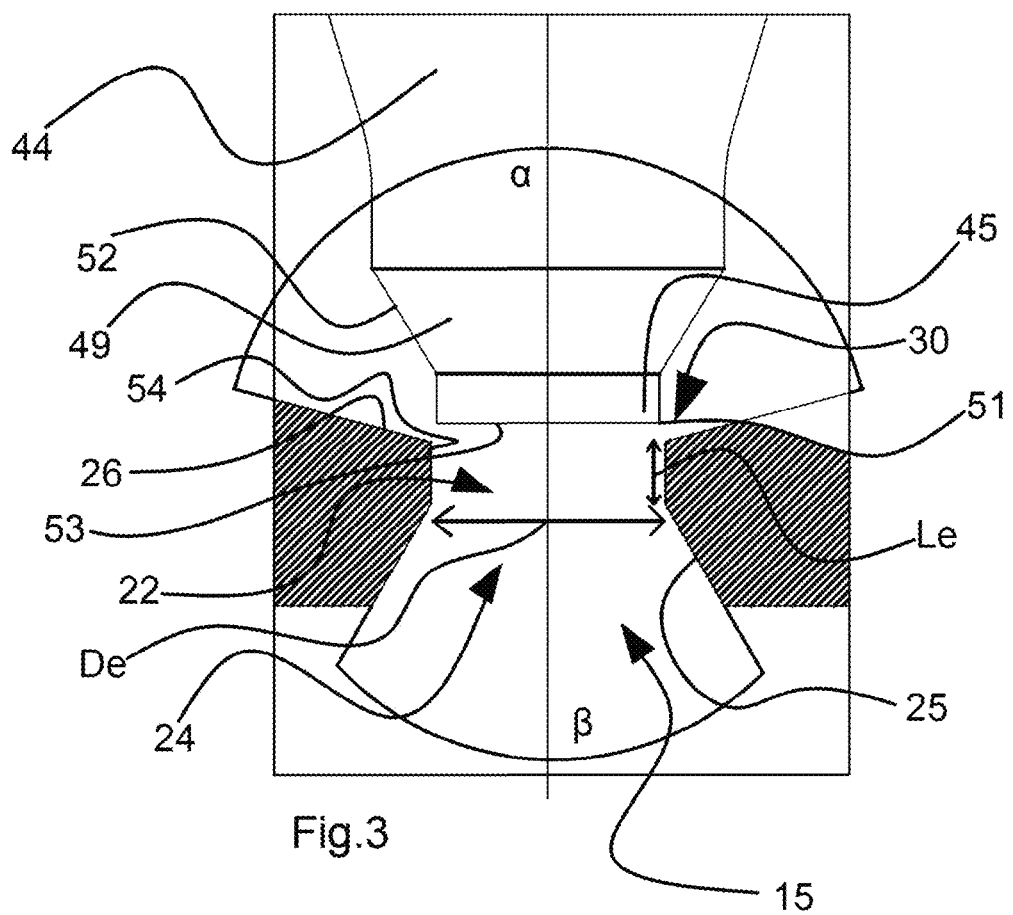
FIG. 3 shows a detail of the injection module of the injector device
Figure 4:
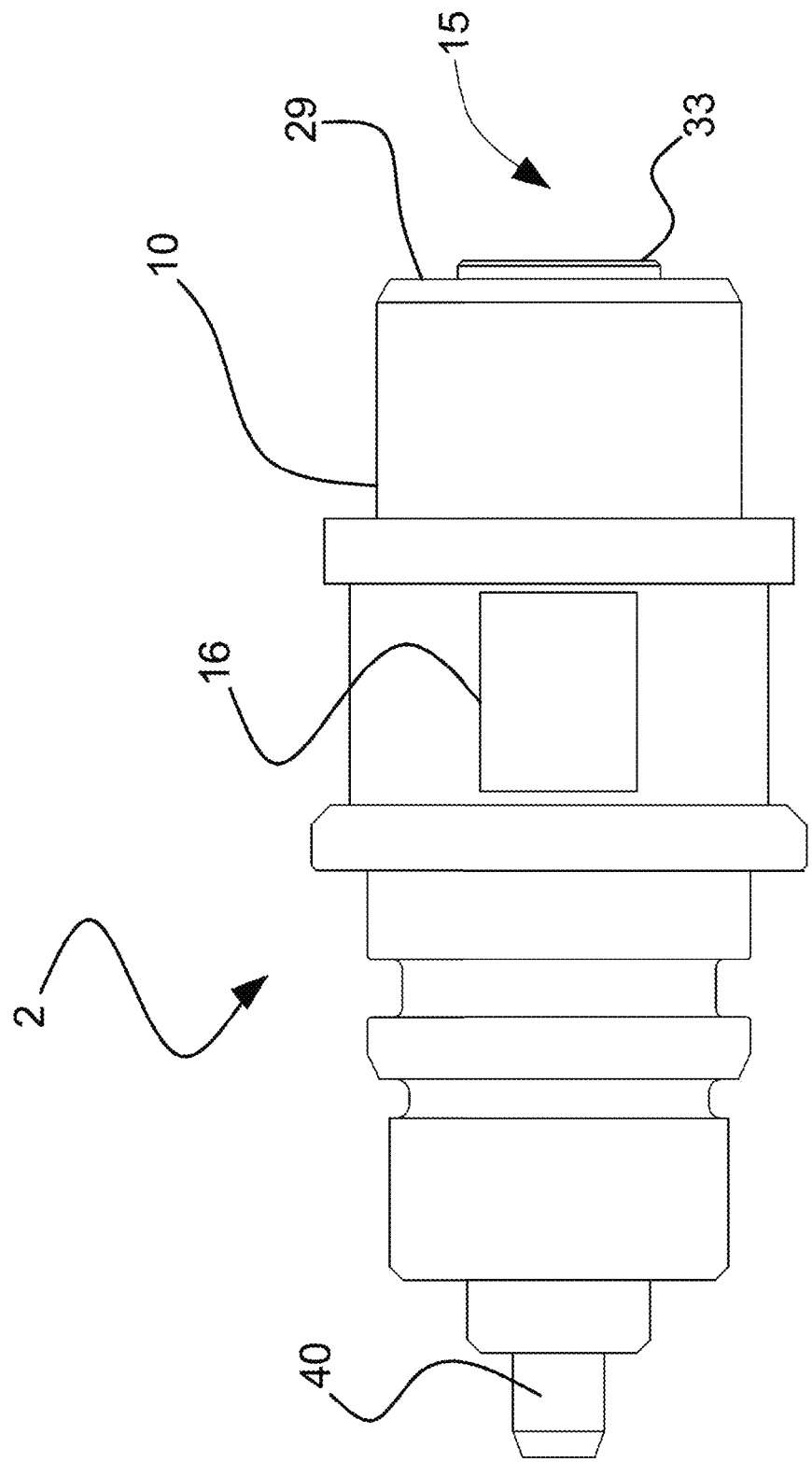
FIGS. 4 and 5 show respectively a part of the injection module and the adjusting and control unit.
Figure 5:
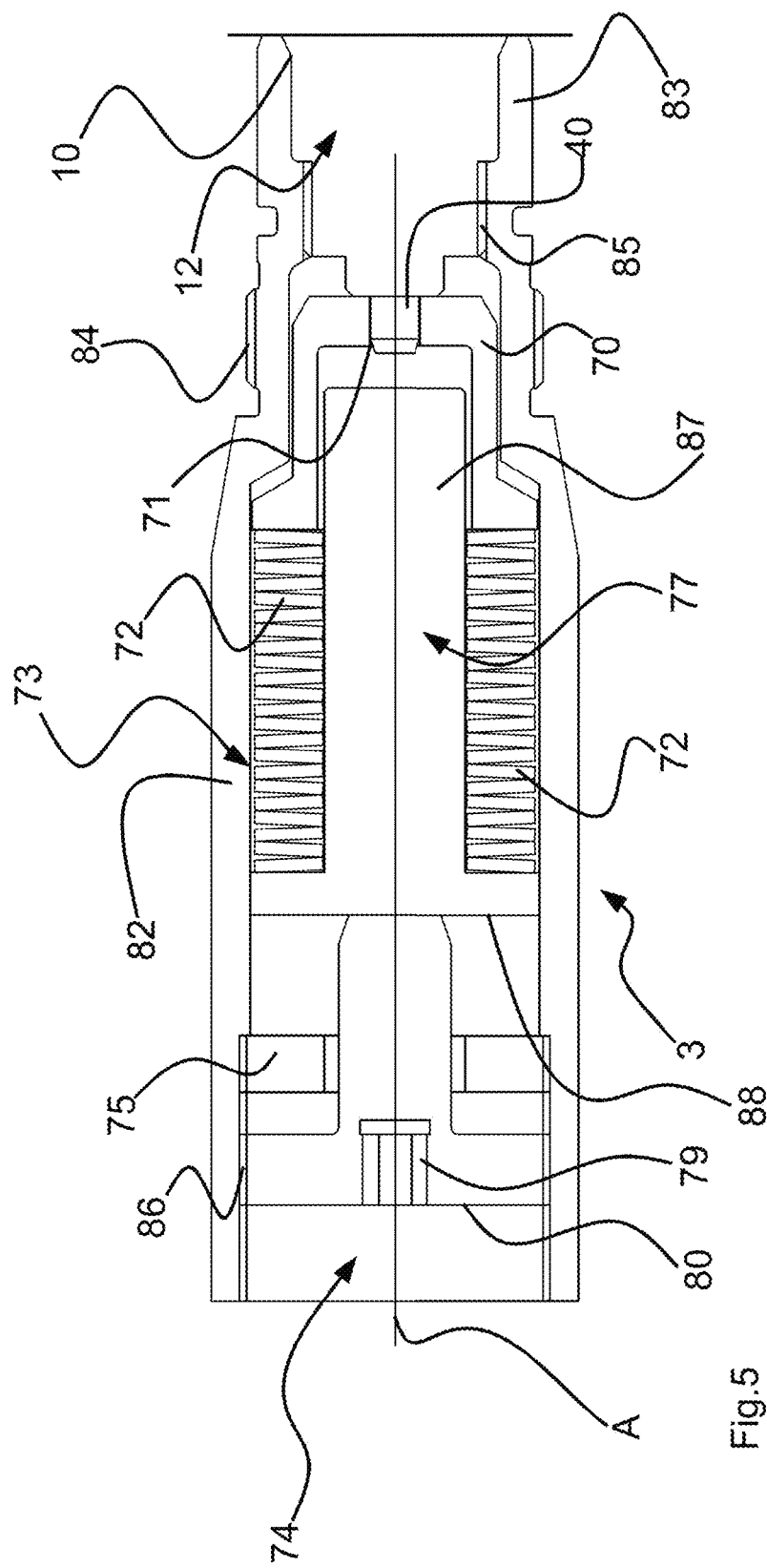

The modular unit 2, shown in FIG. 2-3-4, includes a housing and guide hollow body 10 inside which a cursor or partialization and control element 11, also simply defined as a pin, slides, including a tip or end tang portion or simply tip 45, shaped with an end surface 53 and a flat circular edge 51. Both the hollow body 10 and the partialization and control element 11 extend along a longitudinal axis A. The position of the pin 11 inside the hollow body 10 adjusts the size of the hydraulic narrowing 30, that is the transit section that is available for the reactive liquid component through which it flows to a mixing chamber 4.

In FIG. 22-23, the mixing chamber 4 is shown, on which two injecting devices 1A and 1B face one another. The mixing process is actuated by the position of the slide valve 5, on which slots 6 are obtained, configured to direct the flow of each of the reactive liquid components exiting the injector device 1 towards recirculating conduits 7 connected to the tanks of the component. The operation of the slide valve 5 will be disclosed in greater detail below.

The hollow body 10 includes respectively a guide or sliding section 12 of the pin 11, supportingly connected to the modular adjusting and contrasting unit 3, an inlet chamber 13 for the reactive liquid components, provided with one or more supply openings 16 obtained radially with respect to the axis A, an end conveying volume or chamber 19, also defined as an end volume or chamber 19, and a nozzle orifice 15 or nozzle for the flow of the reactive components to the mixing chamber 4, obtained on the bottom 29 of the hollow body 10.

The shape of the hollow body 10 is obtained by revolution machining techniques; in particular, by turning operations and subsequent grinding, a perfect concentricity is obtained between the guide section 12 and the nozzle orifice 15.

The guide section 12 is of cylindrical shape, with a height H and a diameter W, as shown in FIG. 2. The ratio H/W between length and diameter is greater than 1.

The inlet chamber 13 is connected to dosed supply conduits of the reactive liquid components by one or more radial openings 16 obtained in the hollow body 10, to permit the inflow of the reactive components inside the injector device 1. The dispensing conduits are connected to and supplied by an annular or partially annular chamber obtained in the body of the mixing head 8.

The inlet chamber 13 includes tilted surfaces 20 that converge towards the conveying chamber 19, operating a first gradual narrowing of the hollow body 10. The surfaces 20 are shaped to facilitate the flow of the reactive components to the nozzle 15 and to generate a state of turbulence inside the reactive liquid component to be ejected into the mixing chamber 4.

The second conveying volume or chamber 19 is defined by tilting convergent surfaces 26, so conformed as to lead the reactive components towards the nozzle 15 and generate along the annular narrowed section 30 a turbulence state inside the liquid component to be ejected into the mixing chamber 4.

In order to convey the liquid to the bottom 29 and the respective nozzle orifice 15 and the mixing chamber 4, the inlet chamber 13 and the conveying chamber 19 gradually narrow down to the nozzle 15 of the bottom 29.

The inlet chamber 13 is shaped with a first gradual narrowing of the section of the hollow body 10. The geometric configuration of the inlet chamber 13 generates a flow conveyed in a turbulent state of the reactive liquid component, performing a so-called "turbulator" function synergically with the conformation of the pin 11 and a symmetric pre-distribution function of the flow with respect to the axis A. In particular, the flow of reactive liquid component passes through an annular transit section 27, positioned between the tilted surfaces 20 of the supply chamber 13 and a collar or ridge turbulator element 43,43A, 43B,43C obtained on the pin 11, as it will be disclosed in detail subsequently. The transit of the flow along the tilted surfaces of the collar ridges 43A and 43C causes a Venturi effect on the same surfaces.

The second end conveying volume or chamber 19 performs a second gradual narrowing of the section of the hollow body 10. In the end chamber 19, the flow of the reactive liquid component is distributed symmetrically with respect to the axis A, before being delivered inside the nozzle 15 through the narrowed section 30. It is important that the flow downstream of the narrowed section 30 is axisymmetric and convergent to form a contracted vein and generate an even more intense turbulence, already induced by the contraction in the jet that exits the nozzle 15, and to exert a further thrust on the end surface 53 of the pin 11 with a flat circular edge 51 to retract the pin 11 in relation to the flowrate arising from the flow converging to the narrowed section 30.

The end conveying volume or chamber 19 includes a first cylindrical section, the section of which along a plane perpendicular to the longitudinal axis A has a diameter $D_C$ and a second frustoconical portion bounded by tilted surfaces 26 characterized by an angular opening α variable between 140° and 170°, more precisely between 145° and 160°. For greater angular opening values α, the thrust effect on the end surface 53 with a flat circular edge 51 and on the frustoconical surface 52 of the pin 11 arising from the converging flow decreases.

For angular opening values α of the tilted surfaces 26 that are less than 140° in an axisymmetric condition with respect to the axis A, downstream of said narrowed section 30 the flow of reactive liquid component converges with less radial speed and consequently with excessively reduced radial kinetic energy. The result is a less effective contracted vein, provided with poor turbulence induced by the contraction in the jet that exits the nozzle 15. The energy that is dissipated by the viscous flowing of the flow of reactive liquid component before it passes through the narrowed section 30 also increases noticeably.

This effect weakens the effectiveness of the jets of reactive components, which, if they are axisymmetric, meet at the focal point inside the mixing chamber 4, which diminishes the effectiveness of the mixing between the various reactive components, which is strongly dependent on the kinetic energy and on the turbulence induced by the mixing itself.

Angular opening values α included between 145° and 160° contribute to generate a sufficiently effective "contracted vein" effect and an effect of greater opening pressure on the pin 11 with respect to a conveying volume bounded by a surface that is perpendicular to the direction of the flow.

Furthermore, it allows to realize a thickness of the bottom 29 of the hollow body 10 that effectively resists the fatigue and cutting stresses caused by the pressure of the fluid and by the force exerted of the pin 11 when closed and pressed by the preloading force set by the modular unit 3 and by the repeated blows inflicted at the end of each dispensing that the pin 11 applies to a circular corner edge 28 of the nozzle 15, when the pressure of the reactive liquid component in the end chamber 19 suddenly fails following the opening of the recirculating valves of the reactive liquid components placed along the pipes that supply the reactive liquid components upstream of the flow afferent to the injector device 1 itself.

These tilt values of the angular opening α of the tilted surfaces 26 further enable a step extension 33, or simply step, to be obtained on the bottom 29, which brings the nozzle 15 near to the mixing chamber 4, without compromising the resistance of the walls thereof to the stress caused by the pin 11 and by the pressure of the fluid.

The step 33 can have a thickness related to the diameter of the end chamber 19 that varies from 0.5 to 1.2 mm in a function that is inverse to the diameter of the mixing chamber 4 that it faces. In fact, small mixing chamber diameters (from 5 to 8 mm) require a reduced step 33 in order not to create interference with the slide valve or slidable valve element. For greater diameters, up to 24 mm, it is possible to increase the thickness of the step 33 up to 1.2 mm.

The nozzle orifice or nozzle 15 has a transit section 22 defined by a cylindrical surface 54, having a length $L_E$ and by a diameter $D_E$. The circular corner edge 28 joins the tilted surfaces 26 of the end section 19 to the cylindrical surface 54 of the transit section 22 of the nozzle 15. The cylindrical surface 54 widens into an outlet section 24 of frustoconical shape, bounded by frustoconical tilted surfaces 25 that widen towards the mixing chamber 4, with an angular opening that has different angular values and is opposite to the tilted surfaces 26.

The angular opening values can vary from 15° to 120°. In particular, angles between 20° and 90° ensure an effective detachment of the vein on the outlet section 24.

The transit section 22 has controlled geometric dimensions, to form a so-called narrowing "in a thin wall" and reduce the dissipations that more extended surfaces 54 of the transit section 22 of the nozzle 15 could cause. More precisely, the ratio $L_E/D_E$ between the value of the length $L_E$ and the value of the diameter $D_E$ of the circular section of the nozzle 15 is variable from 0.1 to 0.7, even more precisely between 0.1 and 0.5. In other words, the length $L_E$ of the nozzle 15 has a measurement that is variable between 10% and 70% of the diameter $D_E$.

The structural configuration of the inner part of the bottom 29 of the hollow body 10 is defined by the tilted surfaces 26, which bound the frustoconical portion of the conveying end chamber 19, which narrows towards the cylindrical transit section 22 of the nozzle 15. The tilted surfaces 26 are connected to the nozzle orifice 15 with the circular corner edge 28, in particular to the cylindrical surface 54 that bounds the transit section 22. As disclosed above, the length $L_E$ of the transit section 22 is less than the diameter $D_E$ of the circular section itself. The cylindrical surface 54 is connected to the outlet section 24 of the nozzle orifice 15, bounded by the tilted surfaces 25 that widen towards and face the mixing chamber 4 of the mixing head 8. The angular opening β of the tilted surfaces 25 is opposite to the aforesaid surfaces 26, as visible in FIG. 3.

The structural configuration disclosed so far of the hollow body 10, in particular of the bottom 29, creates in synergy with the pin 11 a so-called hydraulic narrowing 30 "in a thin wall". The thus conformed step 33 does not affect the efficiency of the jet of reactive component and ensures the necessary mechanical toughness at the bottom of the injector device 1, to which is applied, as it will be explained subsequently in greater detail, a cyclical force arising from a preset elastic load and from the pressure of the reactive liquid component.

On the narrowed section 30 in a thin wall, according to the fluid dynamic simulations, a shear rate value is observed that is not influenced by the presence of the turbulator ridge 43. The shear rate is characterized by a good homogeneity along the narrowed section 30: this shows that the linked friction dissipating phenomena occur to a limited extent, also because of the aforesaid "thin wall" configuration.

Figure 17:
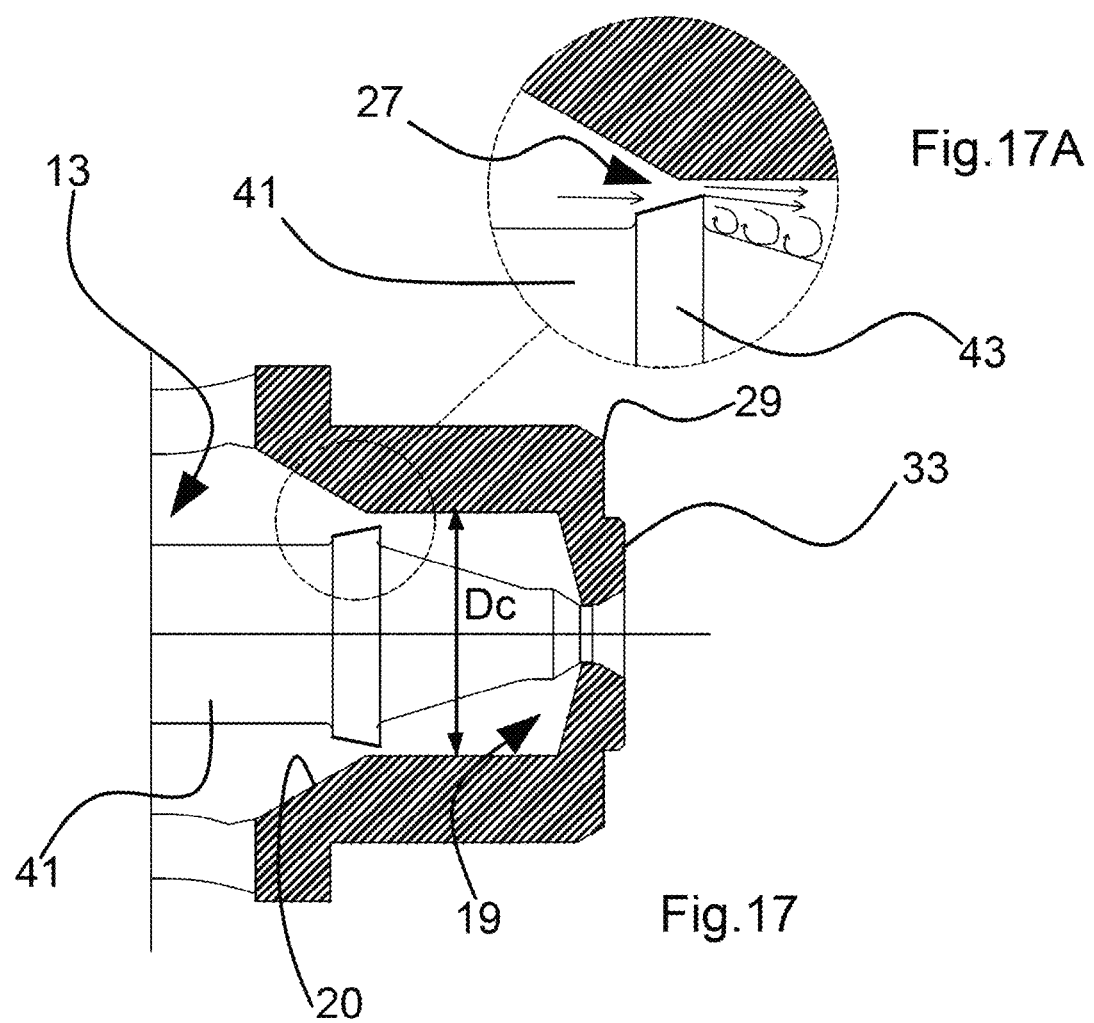

The optimum and groupable values of the diameter $D_C$ of the cylindrical portion of the end chamber 19, visible in FIG. 17, in relation to the diameter $D_E$ of the nozzle orifice 15 arise from thorough research and experiment. The pairs of values are shown in the following table.

| Nozzle orifice diameter $D_E$ | Conveying chamber diameter $D_C$ (inner thread) | Ratio $D_E/D_C$ |
|---|---|---|
| 0.8 | 8.2 | 10.3 |
| 1 | 8.2 | 8.2 |
| 1.5 | 8.2 | 5.5 |
| 2 | 8.2 | 4.1 |
| 2.5 | 8.7 | 3.5 |
| 3 | 9 | 3.0 |
| 3.5 | 9.5 | 2.7 |
| 4 | 10 | 2.5 |
| 5 | 10 | 2.0 |
| 6 | 10.5 | 1.8 |

The partialization element 11 includes a rear tang portion 40 configured to couple with a cup-shaped spacer 70 with inner centring hole 71 connected to the modular adjusting and contrasting unit 3. Between the rear tang portion 40 and a sliding surface, a threaded portion is obtained that is arranged to extract the pin 11 from the injector device 1 for possible maintenance.

The pin 11 includes a sliding and guide cylindrical portion 41 along which annular slots 42 with an internal diameter z are obtained to house the hydraulic seal.

The seals are indispensable for preventing the pressurized reactive component from leaking from the chamber 13 to the adjusting and control unit 3 of the hydraulic narrowing 30. The hydraulic seal includes an annular seal element 31, or simply a ring, that can possibly rest externally on a Teflon or another low-friction polymer ring 34.

The surface of the circular guide section 12 measures over 30% more than the circular section with a diameter $D_E$ of the nozzle 15, in order to ensure the appropriate operation of the injector device 1, in particular to ensure that, when the injector device 1 operates and the pressurized reactive liquid component inside the hollow body 10, the pressure of the reactive liquid component in the chambers 13 and 19 generates a thrust suitable for retracting the pin 11 itself.

The contrasting force exerted by the adjusting unit 3 is such as to balance the pressure exerted by the reactive liquid component, maintaining the variations thereof within contained values, precisely within ±10% of the setting value and more precisely within ±5%.

The pin 11 includes a collar turbulator ridge 43,43A,43B, 43C, which is also defined simply as a ridge or collar, configured to generate pulsing turbulence in the flow of the reactive liquid component that flows inside the hollow body 10. Inside the hollow body 10, the turbulator ridge 43 is positioned at a reduction of diameter obtained between the first inlet chamber 13 and the second end chamber 19, making an annular transit section 27 along which the reactive liquid component flows in the direction of the nozzle 15. The transit of the reactive liquid component inside the transit annular section 27, in addition to promoting the axial symmetric homogeneous distribution of the flow to the chamber 19, generates in the liquid pulsing turbulent vortices below the ridge 43, which is caused by the vein detachment that occurs when section changes suddenly and is caused by the sharp corners obtained on the aforesaid annular ridge 43. The vein detachment and the corresponding pulsing vortices depend of the sliding speed of the reactive liquid component inside the hollow body 10 of the injector device 1.

The turbulator ridge 43, as shown in FIG. 6-9, can be bounded by peripheral surfaces having different shapes, amongst which, for example, a frustoconical shape in relation to the ridge 43A, or a shape referred to the ridge 43B, consisting of two frustoconical half-surfaces 46,47 that are opposite to a plane that is orthogonal to the axis A of longitudinal symmetry, or also a shape referred to the ridge 43C, characterised by the coupling of a tapered shape and a cylindrical shape.

In particular, the turbulator ridge 43A and 43C according to the embodiment of frustoconical shape enables to increase the effect of the pulsing vortices that are caused by the vein detachment, are simpler to implement and also achieve a Venturi effect along the tilted surface the intensity of which depends on the fluid flowrate that flows there. The Venturi effect contributes to diminishing the necessary preload on the pin 11 to generate the setting pressure at high and nominal flowrates.

The pin 11 includes a junction portion 44,44A,44B connected to a tip end portion 45, or simply tip, by a connecting portion 49 of frustoconical shape that converges on the tip 45 with converging tilted surfaces 52.

The tip 45 includes an end surface 53 of the pin 11 and a flat edge with circular corner 51.

The flat circular edge 51 of the tip 45 is configured to interact with the nozzle 15 to adjust the flow of reactive liquid component inside therein via a variable hydraulic narrowing. The tip portion 45 is further configured geometrically and made to form clearance c with the surface 54 of the transit section 22 of the nozzle 15.

The junction portion 44, the connecting portion 49 and the tip 45 of the pin 11 can have different geometric configurations. Some embodiments of the junction portion 44 are shown in FIG. 10-11.

Figure 10:
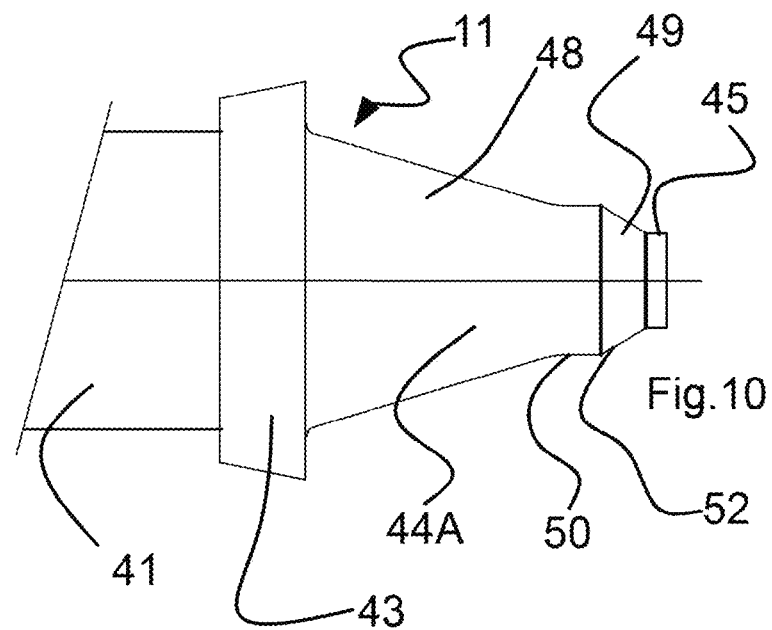
FIGS. 10 and 11, show a further portion of the partialization and control element (pin element) according to various possible embodiments.

In the embodiment of FIG. 10, the junction portion 44A of the pin 11 and the connecting portion 49 taper towards the tip 45. The geometric configuration has a first frustoconical sector 48 and a second cylindrical sector 50 to which the connecting portion 49 is connected with a convergent surface 52.

Figure 11:
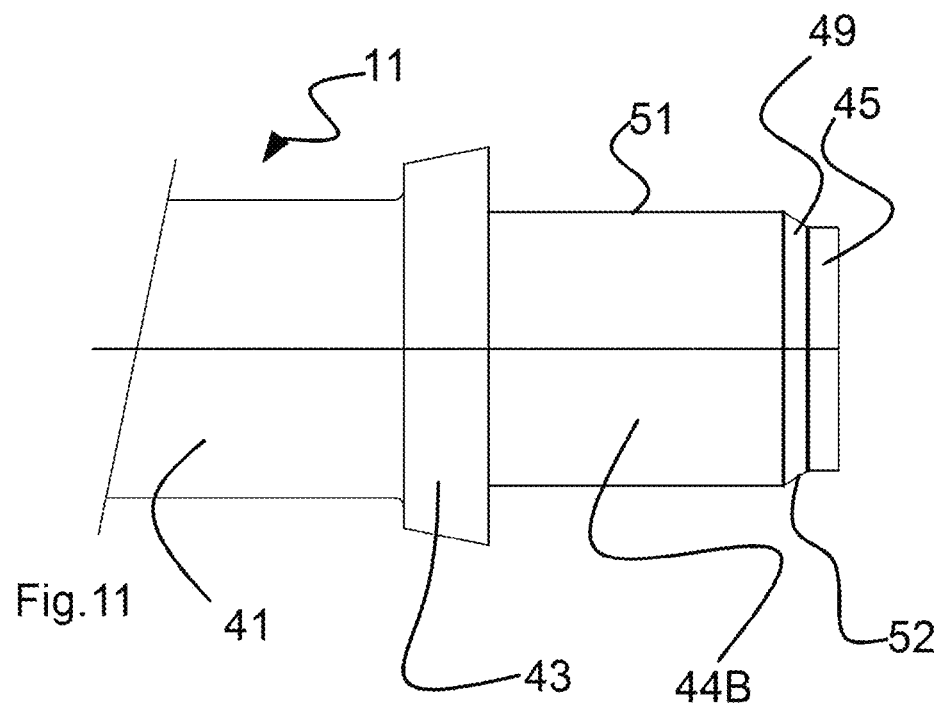

In the embodiment of FIG. 11, the junction portion 44B is substantially of cylindrical shape, to maintain the pulsing effect due to the vein detachment below the turbulator ridge 43, to which the connecting portion 49 is connected, with a convergent surface 52 that is reduced and tapered towards the tip element 45 that has, in this case, a circular end surface 53 that has a large active compensating surface.

Some embodiments of the tip portion 45 provided with a flat circular edge 51 are shown in FIG. 12-16.

In the embodiment visible in FIG. 12-14, the tip 45 has a cylindrical shape in which the flat circular edge 51 has a diameter $D_I$. The diameter $D_I$ measures less than the diameter $D_E$ of the circular surface 54 of the transit section 22 of the nozzle orifice 15 with which it interacts in order to create the clearance c when the tip 45 is inserted inside the nozzle orifice 15. The clearance measurement c is calculatable using the following equation:

$$c = \frac{D_E - D_I}{2} \quad (1)$$

Figure 15:
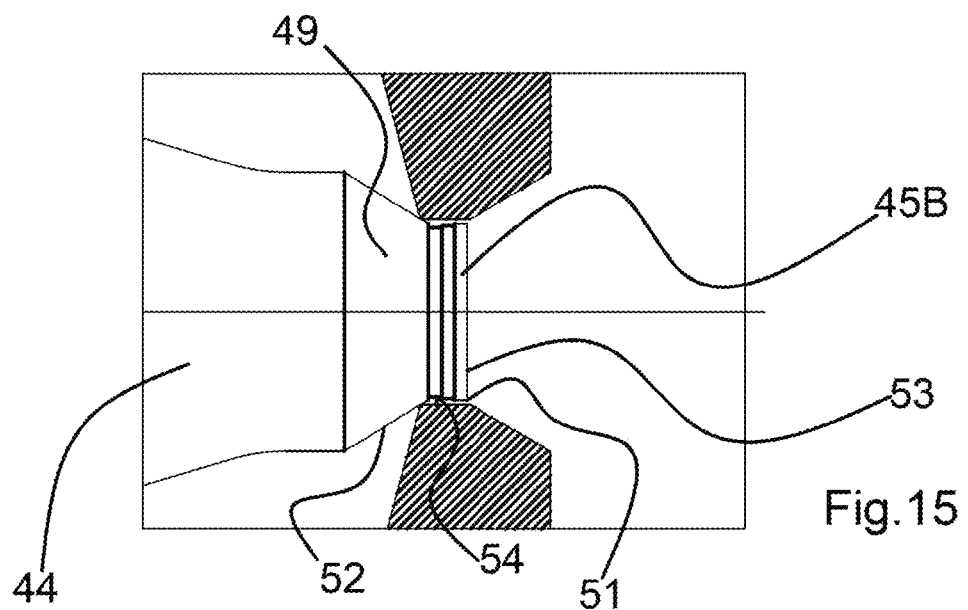
FIGS. 15 and 16 show the end portion made according to alternative embodiments.

In the embodiment of FIG. 15, the tip portion 45B is configured geometrically with superimposed cylindrical steps of increasing diameter towards the outside of the nozzle 15e, analogously in the direction of the end surface 53.

Figure 16:
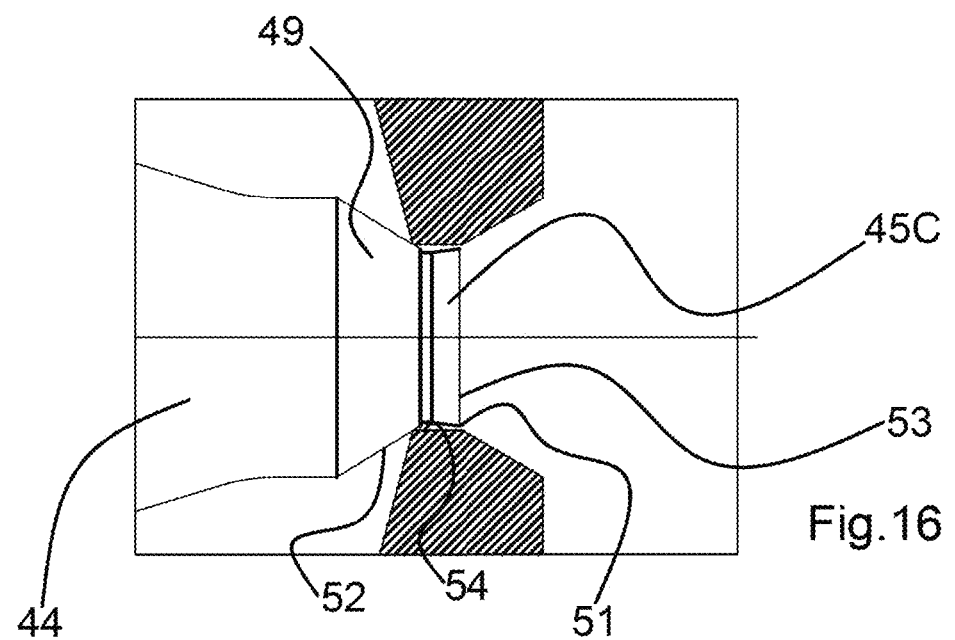

In the embodiment of FIG. 16, the tip portion 45C is configured geometrically with a cylindrical shape on which a frustoconical shape is superimposed that diverges outwards and in the direction of the end surface 53.

Both the configurations shown in FIG. 15-16 maintain the flat circular edge 51.

As will be explained exactly further on, in the period in which the injector device 1 is inactive, i.e. when the flow is not supplied or when it is recirculated by activating a bypass conduit outside the mixing head 8, the tip 45 penetrates the nozzle 15 according to the push set by the modular adjusting and contrasting unit 3, until the surface 52 of the connecting portion 49 of the cursor or pin 11 is rested on the circular edge 28 of the nozzle 15, closing the transit of the reactive liquid component inside the nozzle 15. On the other hand, in the period in which the injector device 1 is supplied and active, the reactive liquid component flows inside the hollow body 10, through the conveying chamber 19. When the flow finds the section of the nozzle 15 occluded or excessively narrowed, the local pressure of the liquid increases rapidly. The liquid then exerts a thrust $F_{PC}$ on the pin 11. As long as the thrust $F_{PC}$ exerted by the reactive liquid component exceeds the force $F_{EL}$ set by the modular adjusting and contrasting unit 3, the flat circular edge 51 of the tip 45 of the pin 11 moves away from the nozzle 15 as far as a defined retraction position y of the edge 51 of the tip 45 with respect to the edge 28 of the nozzle 15, corresponding to the narrowed active section 30 through which the reactive liquid component flows inside the nozzle 15 to the mixing chamber 4 at a supply pressure of the injector device 1 corresponding to the presetting of the thrust of the modular unit 3 applied by the operator for a determined flowrate.

The narrowed active section 30 coincides with the frustoconical side surface bounded by a flat circular edge 51 of the tip portion 45 and by the further circular edge 28, in turn defined by the intersection between the tilted surfaces 26 and the cylindrical surface 54 of the transit section 22 of the nozzle 15. The flat circular edge 51 on the tip 45 has a smaller diameter $D_I$ than the diameter $D_E$ of the circular section defined by the circular corner edge 28.

In other words, the narrowed active section 30 has a frustoconical surface that extends around the longitudinal axis A and diverges towards the mixing chamber 4.

The configuration and the geometry of the hollow body 10 are fundamental for allowing a coupling between nozzle 15 and pin 11, so that they are perfectly centred and coaxial with respect to the longitudinal axis A. The perfect centring between the tip 45 of the pin 11 and nozzle 15 is the geometric condition that ensures that the jet of reactive liquid component with high kinetic energy exiting the nozzle 15 partialized by the pin 11 is perfectly symmetrical and coaxial with respect to the longitudinal axis A.

This ensures the precise direction and symmetry of the jet. It is easy experimentally to detect that even small eccentricities between the flat circular edge 51 of the tip 45 of the pin 11 and nozzle 15 give rise to jets that deviate by different degrees from the axis of the injector device 1; not only, but the exiting jet has a geometry with an irregular impact with flowrate accumulation preferably on the side where the clearance c between the pin 11 and nozzle 15 is greater.

Coaxiality and eccentricity errors significantly reduce the efficiency of the mixing process through turbulence induced by the impingement of high energy jets.

Accordingly, the constructional symmetry and the chosen shape of pin 11 and nozzle 15 ensure the most efficient mixture of the reactive liquid components in the mixing chamber 4.

In particular, the hollow body 10, including the guide section 12, the opening of the nozzle 15, the chambers 13 and 19, can be obtained in a single piece both through turning and through subsequent grinding, with a single placement that ensures rotation thereof around the placement axis for all processings that ensure axial symmetry thereof.

In particular, the guide section 12 of the nozzle 15 is ground by inserting the grinding wheels that perform the grinding operation from the back, where there is the guide section 12. The diameter of this section enables to achieve dimensions of the nozzle 15 with a section up to 30% less than that of the guide hole, maintaining the perfect axial symmetry.

Furthermore, the realization of the supply openings 16 of the reactive components in positions that are symmetric to the axis A ensures that distortions of the geometry do not occur during thermal treatments and subsequent relaxations.

The geometric features of the tip 45 are fundamental to maximize the ratio between the area of the narrowed section 30 and the retraction position y of the tip 45. The objective is to obtain a high increase ratio of the area of narrowed section 30 for minimum movements, that is for an increase of the opening displacement of the pin 11 along the axis A, or better for minimum retraction values y. The narrowed section gain in function of minimum increases in displacements y along the axis A is obtainable to a greater extent if the clearance c between tip 15 and nozzle 11 is not reduced or is inexistent.

In order to obtain a high increase gain of narrowed section 30 for minimum increases in displacements y of the flat circular edge 51 of the tip 45, the clearance c, in a version, measures between 1.5% and 10% of the diameter $D_E$ of the transit section 22 of the nozzle 15, more precisely measures between 2% and 7% of the diameter $D_E$. The tilt of the tilted surfaces 26 and 52, and of the tilted surfaces 25 of the outlet section 24, contribute to generate a flow of the jet of the reactive component characterised by an optimum shear rate distribution along the narroweded section 30 included between the circular corner edges 28 and 51. This flow enables to obtain limited sliding losses near the circular corner edges 28 and 51 of the narrowed section 30 and sufficiently homogeneous shear rate values for the intermediate sections at the circular corner edges 28 and 51 in the reactive component.

The modular adjusting unit 3 of the size of the narrowed active section 30 has the function of adjusting the pressure in the end chamber 19 by adapting the position of the circular edge 51 of the tip 45 of the pin 11, relative to the edge 28 of the nozzle 15, to the flowrate of the reactive liquid component that passes through the nozzle 15, so as to stabilize the narrowed active transit section 30 of the reactive component at the inlet of the nozzle 15 and ensure the ejection of the liquid at the kinetic energy required for the mixing. The modular adjusting and contrasting unit 3 is coupled with the rear portion 40 of the pin so as to leave a minimum clearance, such as to permit possible misalignments with respect to the longitudinal axis A.

The modular adjusting and contrasting unit 3 includes a housing body 82 having a hexagonal external section, on the end section 83 of which of cylindrical shape a second external thread 84 is obtained that is configured to fix the modular unit 3 to the mixing head 8 and a first inner thread 85 configured to sealingly fix the modular adjusting unit 3 of the hydraulic active narrowing 30 to the modular unit 2 including hollow body 10 and pin 11 coupled together.

The modular adjusting and contrasting unit 3 includes elastic elements 72,73 configured to apply a preset contrasting elastic force $F_{EL}$ to the pin 11, to contrast the force that the reactive liquid component exerts on the guiding and sliding cylindrical portion 41 of the pin 11 and accordingly adjust the size of the hydraulic narrowing 30 that is formed between the circular edge 51 of the tip 45 of the pin 11 and the nozzle 15 when the flat circular edge 51 of the tip 45 of the pin 11 moves away from the edge 28 from the nozzle 15. In particular, the elastic elements 72,73 discharge the aforesaid contrasting elastic force $F_{EL}$ onto the rear portion 40 of the pin 11, by the spacer 70.

In order to reduce the pressure variation as the flowrate injected into the injector device 1 varies, the springs of the adjusting and control unit 3, which influence the retraction or advancement of the pin 11 as the flowrate varies, must have a considerable yield to small variations of the counter thrust $F_{PC}$ caused by the pressure variation at the tip end portion 45. This result is achievable by a pile 73 of springs 72 having a limited elastic constant. The lower the elastic constant of the pile of springs, the less the pressure variation in relation to the flowrate variation.

The elastic elements 72 together define a pile 73 of conical disc shaped cup springs 72, serially coupled with reciprocal support surfaces that are alternating and stacked along the axis A. The contact between one spring 72 and the other is point-like, also called "knife blade" type; so the disc springs 72 are not subjected to hysteric rubbing phenomena during the flexure states applied to the springs 72 themselves.

With regard to the use of conical disc springs 72 in this application, the total value of elastic constant of the pile 73 of springs 72 in sequence varies between 80 N/mm and 250 N/mm, more precisely between 100 N/mm and 170 N/mm. In the selected conical disc springs, the elastic constant decreases during the compression. This elastic constant in fact decreases down to 30% of the initial elastic constant value when the deflection of the springs reaches the 90%, with respect to the deflection condition when completely packed. This effect of varying by decreasing the elastic constant in relation to the increase in the deflection encourages the stabilization of the adjustment of the pressure as the flowrate varies.

The conical disc springs have crucial applicational advantages when used to limit the pressure variation in relation to the flowrate variation that flows through the injector device 1. The conical disc springs 72 exert a contrasting elastic force $F_{EL}$ that acts exclusively along the axis A. Differently from the coil springs, the disc springs do not develop a moment component that is perpendicular to the axis A, which would be transmitted to the guide section 12 of the pin 11. This moment, in the case of coil springs is contrasted by the moment of the opposing radial forces that develop along the guide section 12 of the hollow body 10, considerably increasing the friction applied to the guide section 12 by the pin 11.

The conical disc springs, when subjected to compression, store a greater quantity of elastic energy in function of the volume that they occupy, so as to minimise the load variation in function of the applied deflection. This feature determines a lower stiffness of the conical disc springs with respect to other types of linear springs in function of the space available for the housing and of the retracting of the injector device 1. This makes conical disc springs further suitable for providing less load variation in function of the movement variation arising from variations in flowrate, which has to be compensated by an opening variation of the narrowed section 30.

The conical disc springs 72 can be chosen with dimensions, geometries, conicity and thicknesses that vary according to the type of application. One of the aforesaid numerous advantages of the disc springs is the possibility of replacing the disc springs in a modular manner in the event of maintenance.

The pile 73 of disc springs 72 rests below the spacer 70 in contact with the rear tang portion 40 of the pin 11, in order to transmit the contrasting elastic force $F_{EL}$ of the disc springs 72 when they are compressed, applying to the pin 11 the contrasting elastic force $F_{EL}$ preset before the mixing process, determining for each injector device 1 the set nominal flowrate and adjusting the preload of the springs 72 up to the pressure value necessary for an optimum mixing.

Figure 25:
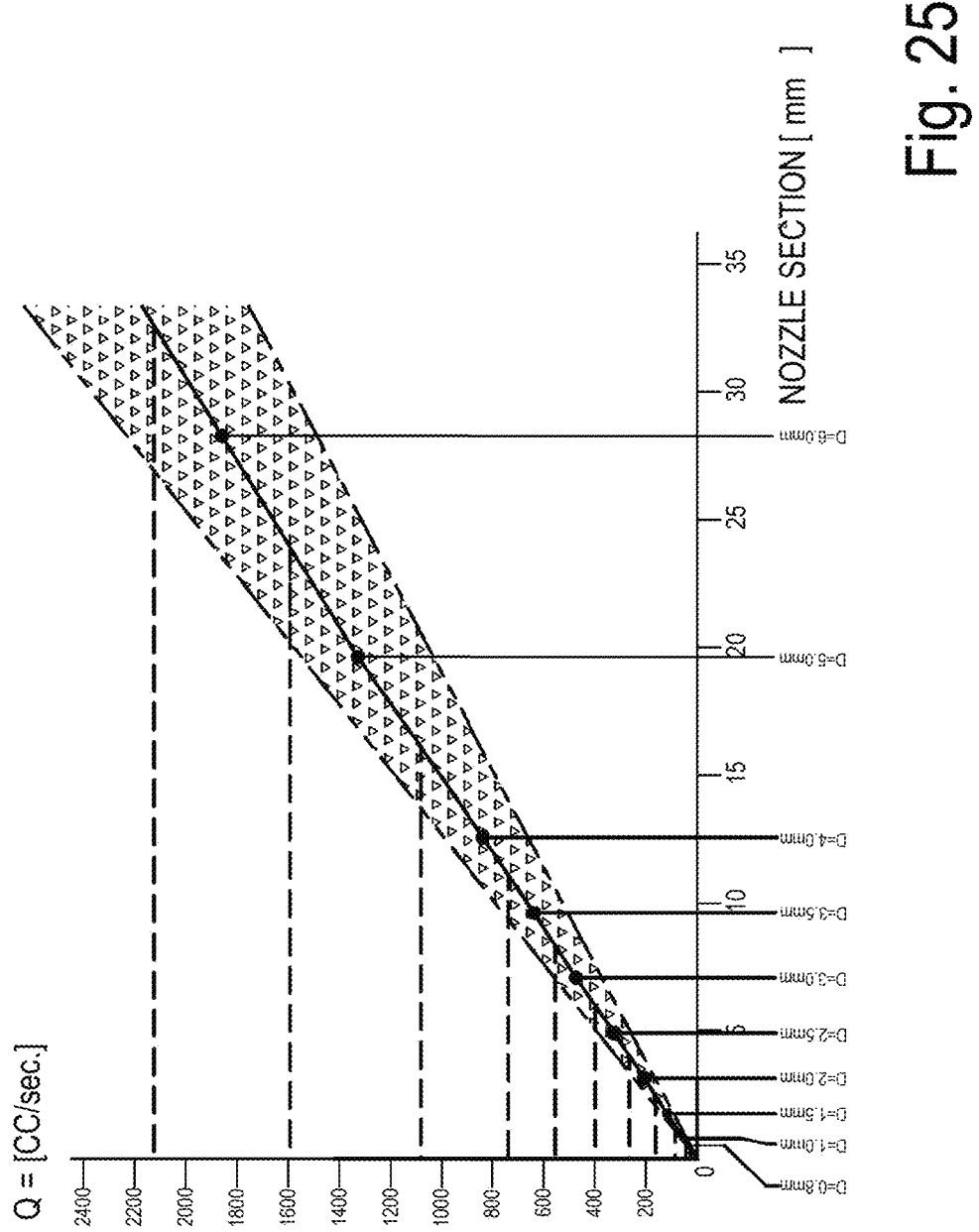
FIG. 25 shows a graph that allows to approximately select the advisable section of the nozzle of the injector device in function of the nominal flowrate value around which to vary the adjusted flowrate.

The graph shown in FIG. 25 indicatively links the advisable section of the nozzle 15 of the injector device 1 to the nominal flowrate value around which the adjusted flowrate can vary for an adjusted pressure of 150 bar.

By way of example, for pressure set at 150 bar, the section of the nozzle 15 can be related to the nominal flowrate with the following relation:

$$S = m \cdot Q \qquad (2)$$

S represents the section of the nozzle 15 measured in mm², Q represents the flowrate measured in $$\frac{cm^3}{sec},$$

m is the proportionality coefficient and is $$m = 0.015 +/-20\% \frac{mm^2 \cdot sec}{cm^3}.$$

The dimension of the section S of the nozzle 15, and consequently of the diameter $D_E$ of the nozzle can be calculated and selected in function of the nominal flowrate around which to vary the flowrate during the dispensing of the reactive liquid component or for subsequent dispensings.

The specific diameter $D_E$ of the nozzle 15 is chosen from a finite series of nozzles 15 with a predefined diameter, using the size of the nozzle 15 that is closest to the nominal flowrate value around which the flowrate is varied during the dispensing, as illustrated by way of example in the fields bounded by dashed lines in the attached graph, assuming that the pressure is adjusted to 150 bar.

The conical disc springs 72 are stacked around a guide element 77 having a "T"-shaped longitudinal section. This guide element 77 includes a stem portion 87 and a head portion 88. The disc springs 72 are placed on the stem portion 87 and support the head portion 88. During the step of making up the modular unit 3, the disc springs 72 are fitted to the stem portion 87 of the guide element 77. The conical disc springs 72 are pre-compressed by a certain amount during the step of setting the pressures upstream of the injector device 1. Above the head portion 88 of the guide element 77, a safety ring nut 75 is arranged, fixed to the housing body 82 on a third thread 86. The safety ring nut 75 is configured to prevent the disc springs 72 from exiting the housing body 82 during the dismantling step.

A presetting element 74 is connected above to the end portion 88 of the guide element 77 and to the pile 73 of disc springs 72, on the side opposite the spacer 70. The guide element 77 is configured to compress the disc springs 72 by a determined preset amount depending on the necessary mixing pressure conditions.

The presetting element 74 includes an hexagonal key hole 79 made on an outer head 80, owing to which the size of the pre-compression of the disc springs 72 can be set and thus the contrasting elastic force $F_{EL}$ acting on the pin 11. Tightening or loosening the head 80 through the hexagonal key hole 79 respectively increases or decreases the compression load on the disc springs 72, thus the preset contrasting elastic force $F_{EL}$ acting on the pin 11.

On the outer surface 80 of the presetting element 74 a radial nonius is obtained that is configured to display the revolution fractions of the hexagonal hole 79, to check the setting of the force $F_{EL}$ with the appropriate precision and repetitivity.

The functioning of the injector device 1 is now explained concisely.

The injector device 1 is in the closed or rest configuration, shown in FIGS. 2 and 12, when it is not traversed by the flow of the reactive liquid component, for example when the reactive resins are recirculated at low pressure outside of the mixing head 8. When the injector device 1 is in the closed configuration, as shown in particular in FIG. 12, the tip 45 of the pin 11 penetrates the transit section 22 of the nozzle 15 owing to the elastic contrasting force $F_{EL}$ exerted by the springs 72, pre-set by the adjusting and control unit 3 to set the nominal pressure upstream of the narrowed section 30. In this condition, the connecting portion 52 of the pin 11 rests on the circular corner edge 28 of the inlet of the nozzle 15 of the hollow body 10.

As shown in FIG. 23, when the slide valve 5 is in an advanced configuration, the slots 6 connect the nozzle 15 of the injector device 1 to the recirculating conduits 7. In this manner, the nominal flowrate that traverses the injector device 1 recirculates through the recirculating conduits 7 and returns to the respective tanks.

In order to pre-set the pressure upstream of the narrowed section 30 on the injector device 1, the operator uses the presetting element 74 to predispose the minimum preload of the pile 73 of springs 72 and controls the supply of the setting flowrate through the injector device 1. Subsequently, the operator increases the preload of the pile 73 of the springs 72 of the modular unit 3 so as to generate a suitable elastic contrasting force $F_{EL}$, so as to generate, through contrasting, the reference pressure referred to the reference flowrate that passes through the injector device 1, so as to vary the pressures around the reference value when the flowrate changes with respect to the nominal value, that is with respect to the reference value of the flowrate change necessary for the injection process. By acting on the presetting element 74, the preload of the disc springs 72 increases or decreases until the reference pressure is obtained, which is read on a gauge or on the panel by the operator.

The injector device 1 is operational when the reactive liquid component flows inside the hollow body 10, entering through the supply openings 16 into the inlet chamber 13. The reactive liquid component flows to the end section 19, by passing through the annular transit section 27, bounded by the turbulator ridge 43 and the tilted surfaces 20 of the first inlet chamber 13. The annular transit section 27 conveys and accelerates the flow to the annular ridge 43. The transit of the reactive liquid component through the section 27 at increased speed causes the detachment of the fluid vein and the generation of pulsing vortices below the turbulator ridge 43. The vortices generate pressure of pulse type and accordingly a high frequency pulsing force $F_{PC}$ in the direction of the axis A that is detectable with an accelerometer that generates a high frequency disturbance on the force that acts along the axis of the pin 11. The vortices are more intense the greater the flowrate of reactive liquid component that flows inside through the transit section 27. In other words, the annular transit section 27 formed by the coupling between annular ridge 43 of the pin 11 and surfaces 20 of the hollow body 10 performs a so-called hydraulic "dither" function on the pin 11, due to the reactive component moving towards the end chamber 19 and the nozzle 15.

The transit of the reactive liquid component in the narrowed section 27 also results in an effect of less pressure on the frustoconical surface of the annular ridge 43A, 43C of the pin 11 in relation to the flow speed before the turbulator ridge 43A, 43C. This solution accentuates the axial "dither" effect on the pin arising from the vortices on the lower surface of the turbulator ridge 43A, 43C and the pressure reduction on the frustoconical surface of the pin 11 acts as a component of further contrast against the springs 72 that is proportional to the flowrate, which accentuates the compensation of the pressure upstream of the narrowed section 30 upon varying of the flowrate.

The speed of the reactive liquid component inside the narrowed section 27 is thus effective in producing the "dither" effect, i.e. the effect due to the presence of forces pulsing at higher frequencies than the mechanical frequencies of the hydraulic system in question. Generally, inside adjusted hydraulic systems, the force or a pulsing movement are applied with active systems by typically sending a high-frequency sinusoidal command on a coil associated with the pin 11.

In this application, a dither effect of the passive self-generating type is achieved.

Figure 24:
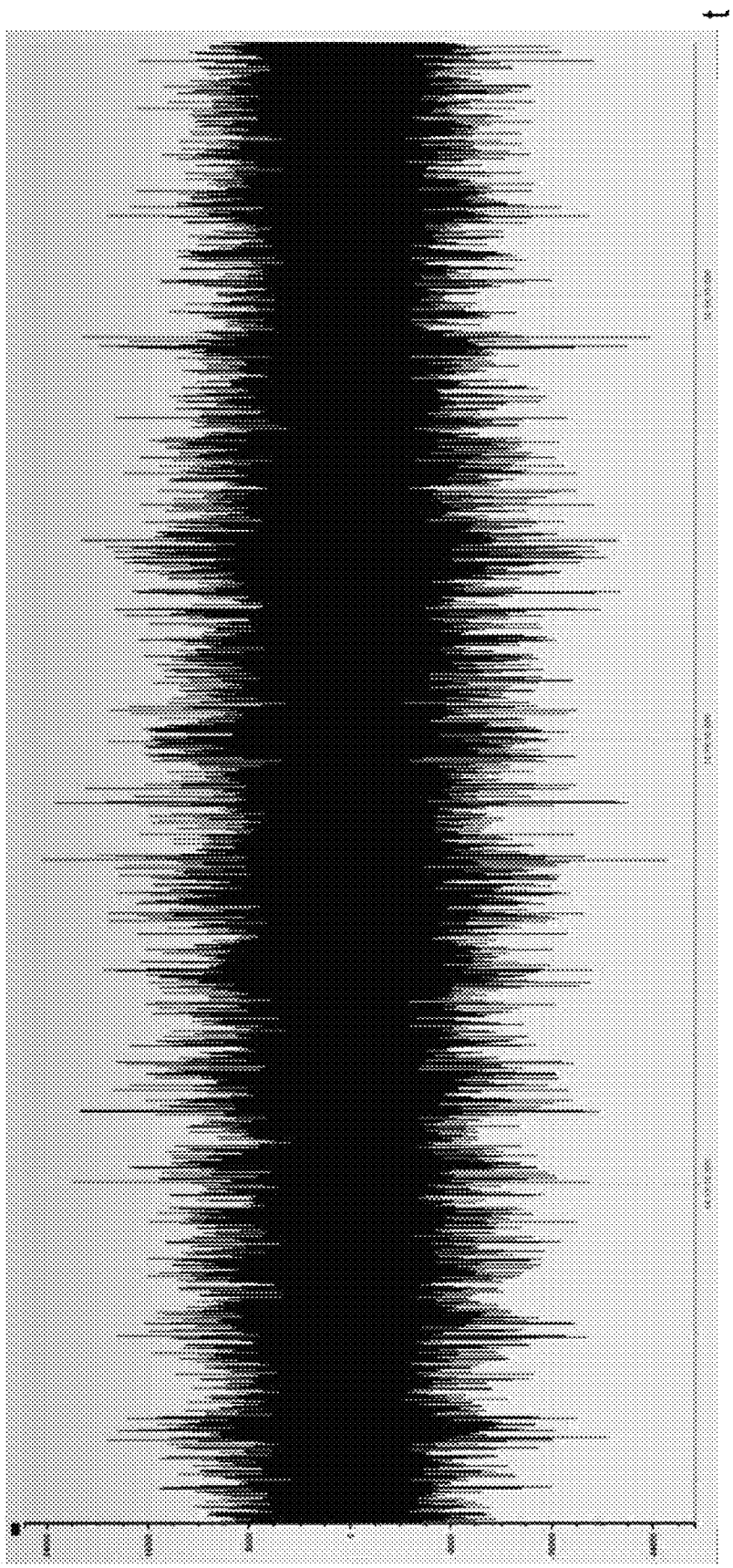
FIG. 24 is a detection, by an accelerometer, of the vibrations that are transmitted to the body of the adjustment module through Dither effect when the injector device is provided with the collar of the 43A and 43C type.

In order to check the onset of this effect and the optimization of the profile of the turbulator ridge 43 that generates the profile, a specific experiment was conducted by applying an accelerometer to the outside of the seat of the injector device 1. The effect of the thus detected pulsing force is shown in FIG. 24.

The experimentation has shown that the effect of the high frequency of the pulsing forces cancels the effects of the friction generated by the seals and of the friction during sliding of the pin 11 in the seat thereof inside the hollow body 10, eliminating the hysteresis effect caused by the friction of first detachment on the movement of the pin 11 when the position of the pin 11 adapts to the varying of the flowrate.

At the start of the supply step of the reactive liquid component through the injector device 1, with the mixing slide valve 5 in an advanced position, the flow that reaches the end chamber 19 finds the nozzle 15 closed and accumulates in the chamber 19. The pressure of the liquid increases immediately until the force $F_{PC}$ arising from said pressure on the connecting portion 44 of the pin 11 exceeds the pre-determined elastic contrasting force $F_{EL}$ exerted by the compressed elastic elements 72, 73, causing the retraction of the flat circular edge 51 of the tip 45 of the pin 11, which in the closed position remained inserted inside the transit section 22. When the preset elastic contrasting force $F_{EL}$ value is exceeded by the force $F_{PC}$ of the pressurized reactive component, the pin 11 retracts with respect to the nozzle orifice 15 pushed along the axis A to the adjusting and control unit 3. The size of the movement depends on the value of the difference $\Delta F = F_{PC} - F_{EL}$ between the force $F_{PC}$ of the pressurized reactive liquid component that pushes on the connecting portion 44 of the pin 11 and the elastic contrasting force $F_{EL}$, which increases with the increase of the deflection of the pile 73.

Figure 18:
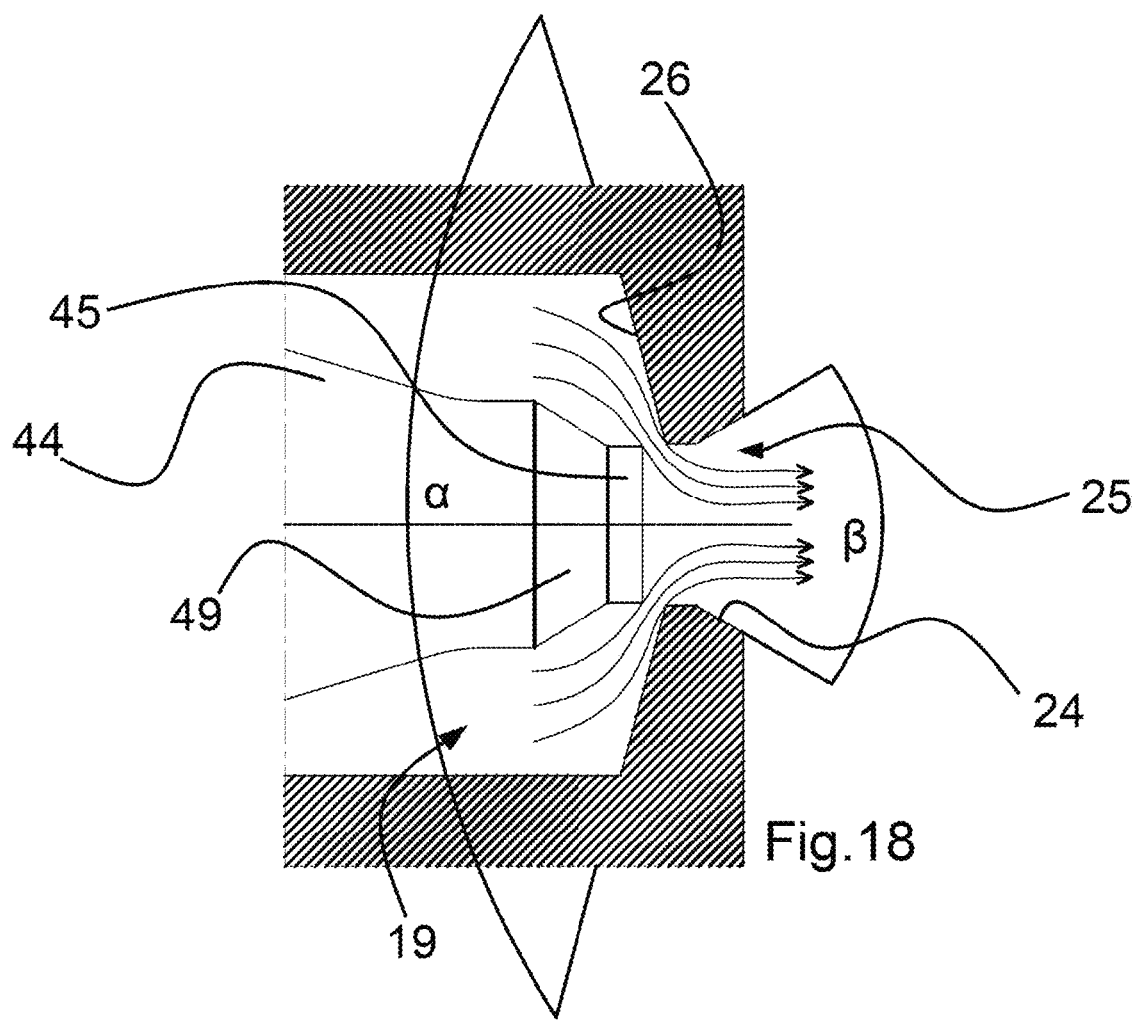
FIG. 18 shows schematically the flow pattern of liquid component exiting the injection module.
Figure 19:
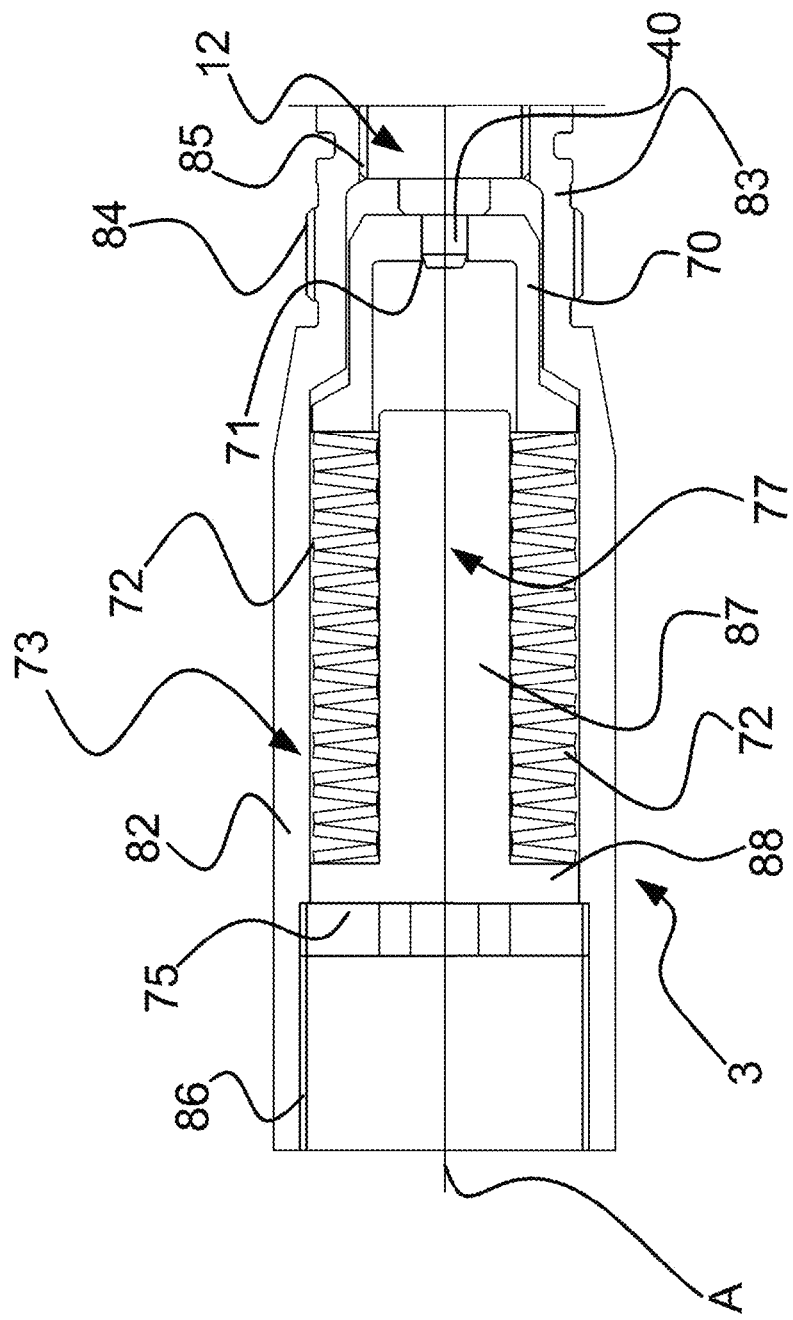
FIG. 19 shows the adjusting and control unit provided with conical disc springs.

By sliding to the rear zone, the tip 45 exits the transit section 22 of the nozzle 15, as shown in FIG. 13. The reactive liquid component that flows in the end chamber 19 moves at the necessary pressure to pass through the narrowed section 30 of frustoconical shape and to then flow in the form of a contracted vein jet through the transit section 22 and the outlet section 24 as far as the mixing chamber 4, as shown in FIG. 18.

As shown in the embodiment of FIG. 22, the slide valve 5 is placed in the retracted condition. In this condition, the jets of reactive components exiting the injector devices 1A and 1B impinge on one another with high energy in the mixing chamber 4.

The retraction of the pin 11 is balanced with the increase in the force of compression of the conical disc springs 72 and the force that the pressure in the chambers 13 and 19 exerts on the sliding section 12 of the pin 11, that is such that $\Delta F=0$.

The flowrate Q of a fluid that flows inside a hydraulic narrowing in a thin wall, like the narrowed section 30, is defined by the following formula:

$$Q = \eta \cdot A \cdot \sqrt{\frac{2(P_a - P_b)}{\rho}} \quad (3)$$

$\eta$ is a coefficient that takes account of the further narrowing arising from the contracted vein of the jet, $\rho$ represents the density of the fluid, $P_a - P_b$ represents the pressure variation through the narrowed section 30, $P_a$ being the pressure upstream of the device 1 that is variable with the flowrate, and $P_b$ the pressure downstream, A the narrowing section, which is variable in function of the flowrate. The aforesaid formula gives the following formula regarding the pressure variation:

$$P_a - P_b = \frac{\rho}{2} \cdot \left(\frac{Q}{\eta A}\right)^2 \quad (4)$$

As can be seen from the formula (4), in order to minimize the pressure variation $P_a$ in function of the flowrate variation Q.

A possible route consists of maximizing the section variation A of the narrowing 30, which coincides with the frustoconical surface that is formed at the moment in which the circular edge 51 of the tip 45 moves away from the circular corner edge 28 of the nozzle orifice 15, upon varying of the flowrate. The value of this area depends on the retraction position y of the circular edge 51 of the tip 45 of the pin 11 that retracts along the axis A with respect to the edge 28 of the transit section 22 of the nozzle 15.

The mathematical relation that links the surface A of the narrowed section 30 of the narrowing and the position y of the circular edge 51 of the retracting tip 45 is as follows:

$$A(y) = \pi \cdot \left(\frac{D_E + D_I}{2}\right) \cdot \sqrt{y^2 + c^2} \quad (5)$$
$$= \pi \cdot (D_I + c) \cdot \sqrt{y^2 + c^2}$$
$$= \pi \cdot (D_E - c) \sqrt{y^2 + c^2}$$

$D_E$ is the diameter of the circular corner edge 28, of the transit section 22 of the nozzle 15, $D_I$ of the with a flat circular corner edge 51 and of the end surface 53 of the tip 45, y is the retraction position of the flat circular edge 51 of the tip 45, c is the dimension of the clearance between the tip 45 and the surface 54 of the transit section 22 of the nozzle 15, $\sqrt{y^2+c^2}$ is the measurement of the apothem of the frustoconical surface, as deducible from FIG. 14.

If the nozzle 15 and pin 11 were coupled without clearance c or with clearance of a few micrometres, the section of the narrowing 30 would be almost cylindrical. In the case of a cylindrical section of the narrowing 30, the section gain, i.e. the variation in section in relation to the movement y of the pin 11, that is to the variation of y, would be less than the frustoconical geometry that provides a certain clearance c, for the same movements y of the tip 45.

The value of the surface A is not influenced by the value of the angular opening $\alpha$ of the surfaces 26, as long as the angle of opening $\alpha$ is maintained the same as or greater than 140°.

Beyond a certain value of the retraction position y of the flat edge 51 of the tip 45, the line that is projected from this edge 51 in a direction that is orthogonal to the surface 26 of the end chamber 19 that is tilted with an opening $\alpha$ of 140° determines the narrowest section. It is accordingly appropriate to select the optimal angular opening $\alpha$ value of the surfaces 26, that are responsible for delivering the reactive liquid component to the nozzle 15 of the end chamber 19 and of the clearance c between the pin 11 and nozzle 15, so as to run the injector device 1 in the condition in which the narrowed section 30 is determined respectively by the circular corner edges 51 and 28.

It must also be considered that very wide angular opening angles $\alpha$, for example over 170° up to flat angles and very small clearance, for example less than a few hundredths of mm, cause a convergence of the flow in the nozzle 15 that requires a greater variation of opening of the pin 11 to obtain the same flowrate.

In other words, a lower vein contraction, that is a lower coefficient $\eta$, requires an higher section A, as can be seen easily from the formula (3).

An angular opening value $\alpha$ of the tilted surfaces 26 has thus been selected that is less than 180°, more precisely comprised between 140° to 170°, even more precisely between 160° and 145°, so as to ensure that the maximum stress section around the circular corner edge 28 of the nozzle 15 is sufficiently thick as to ensure fatigue resistance to the cutting and flexure stress to which it is subjected and, simultaneously, to obtain advantages from the lesser vein contraction.

Other thrust actions intervene on the pin 11 that promote, by virtue of the adopted geometry, the compensation of the variation of pressure in function of the flowrate variation, i.e. the resultant of the forces on the sliding partialization element or pin 11 arising from the flowrate that traverses the injector device 1:

the Venturi effect on the frustoconical surface of the turbulator ridge 43A and 43C to which the push of dither type arising from the vein detachment below the turbulator ridge 43A and 43C is added;
the pressure increase arising from the converging profile between the surfaces 52 and 26;
the force on the end surface 53 of the pin exerted by the pressure of the liquid during recirculation in the slots 6 and during the impingement between the jets of reactive liquid component exiting in the mixing chamber 4 from two or more injector devices 1.

Said further thrust actions are significant for nominal flowrates that require dimensions of the diameter of the nozzle 15 that are greater than 3 mm.

The operator presets the pressure upstream of the injector device 1 by passing the nominal flowrate through an injector device 1 and by adjusting the preload of the pile 73 of springs 72 by acting on the setting element of the preload 74. The operator then sets a preloading of the springs 72 that contrasts also the aforesaid further thrust actions to open on the pin 11 that depend on and are a function of the flowrate.

If said flowrate is decreased below 70% of the preset nominal value, i.e. decreased by over 30%, also the further backward thrusts acting on the pin 11 decrease. Accordingly, during the presetting operation of the pressure at the nominal flowrate, the action of the preloaded springs 72 acts to close the narrowed transit section 30, which adjusts the pressure of the liquid upstream of the injector device 1, with excess force with respect to the force that would be used to generate the narrowed section necessary to obtain the nominal pressure at the nominal flowrate in the absence of said further thrust components. In other words, by reducing the flowrate, also the further thrust components on the pin arising from the nominal flowrate are reduced, so the preload of the springs acts to reduce the narrowed section and, as a result, a condition occurs for which, by decreasing the flowrate a pressure increase occurs upstream of the injector device, a condition that seems to be non-intuitive.

The effects of additional thrust on the pin 11 occur by virtue of the geometry adopted for the two supply sections 13 and 19 of the nozzle 15 and for the narrowed section 30.

The contribution due to the Venturi effect consists of a reduction of the thrust on the frustoconical surfaces of the collar ridges 43A or 43C. The intensity of these forces depends on the variation of the speed of the flow at the transit of the pressurized liquid through the annular transit section 27, if a turbulator ridge 43A and 43C of frustoconical shape is used. The vein detachment effect below the turbulator ridge 43A and 43C moreover exerts a dither effect as already described.

The convergence of the flow between the tilted surfaces of frustoconical shape 52 and 26 generates a further additional thrust in function of the flowrate that traverses that convergent section.

The effect of the additional thrust on the end surface 53 of the pin 11 arises from an increase of the pressure on that surface that occurs both in the closed slide valve recirculating phase and during the impingement of the jets in the mixing chamber 4 during the mixing phase, an impingement that causes the formation of a pressure gradient in the jet itself.

The thrust effect on the end surface 53 becomes significant in systems in which the existing recirculation piping between mixing head and tank has an excessive volume $V=Q \cdot 1$ sec, where V is the volume of the recirculation piping in cubic cm and Q is the nominal flowrate expressed in cm³/sec, through the effect of the hydraulic resistance exerted by the piping during the recirculating and by virtue of the geometry chosen for the injector device 1, both in the recirculation and in the mixing step when the ratio between the surface of the nozzle 15 and that of the sliding section 12 is greater than or the same as 6/49. This thrust effect of a slightly different amount from the recirculating condition is generated also in the mixing phase because of the impingement of the jets in the mixing chamber 4.

After the conclusion of the dispensing with mixing, the slide valve 5 is moved to an advanced position. A valve installed along the supply line of the injector device 1 recirculates the reactive liquid components outside the mixing head 8 and at low pressures. Accordingly, the thrust force $F_{PC}$ of the reactive liquid component arising from the pressure thereof is reduced and the resulting force $\Delta F = F_{PC} - F_{EL}$ is such as to push again the tip 45 of the pin 11 inside the transit section 22 of the nozzle 15. This movement represents the conclusion of the injection cycle. The periodic return of the tip 45 inside the transit section 22 of the nozzle 15 performs a function of mechanical cleaning of the nozzle 15. Inserting the tip 45 expels the residues of reactive liquid component that can be stopped on the cylindrical surface, thus restoring the correct functioning of the nozzle 15. Owing to the cyclical nature of the mixing processes, the configuration of the end part of the injector device 1 has to ensure great resistance to the cutting and flexural stresses of the bottom of the hollow body 10 around the nozzle 15. The configuration of the nozzle 15 made within two cones that converge and have a shape "in a thin wall" meets the aforesaid need. The bottom 29 has sufficient thickness to withstand alternating loads of the pressure of the fluid and of the pin 11 that presses on the circular corner edge 28 of the nozzle 15. Above all, during the concluding steps of the impregnation cycles, it is crucial to avoid that the repeated knocking against the tilted surfaces 26 and the circular corner edge 28 can cause the bottom 29 of the injector device 1 to break if the thickness of the wall is too small.

The hydraulic seal function of the seal, the seat 42 of which is obtained completely on the pin 11, is activated by the initial compression of the seal and by the further hydrostatic pressure of the reactive liquid component that flows from the chamber 13 along the guide section 12 as far as inside the seat 42 and further compresses the seal ring 31, which in turn presses on the inner surface of the peripheral ring 34, if present. This leads the seal ring 31 and the peripheral ring 34, if present, to make a seal on the surface of the seat 42 and on the sliding surface 12 in the sections that the reactive liquid component accesses.

The proposed solution achieves the seal in the sliding section 41 that has the seat in the pin 11. This condition produces much less friction force with respect to the case in which the seat of the seal is on the surface of the sliding hole.

The pressure of the reactive liquid component is integrally transferred to the annular seal element 31, that being elastic achieves an isostatic equilibrium against the surface that contains the annular seal element 31 externally, that is the guide surface 12, or the surface of the respective Teflon ring that acts as an interface with the guide surface 12 of the pin 11.

The inner pressure on the ring $P_a$ is determined by the pressure of the reactive liquid component that deforms the seal ring 31. The ring 31 is in an axial and radial balance determined by the pressure against the containing surfaces.

In an axial direction, it retransmits the force $F_a$ of the pressure of the liquid along the axial containment surface $$F_a = P_l \cdot \frac{\pi \cdot (w^2 - z^2)}{4} \tag{6}$$

$P_l$ represents the pressure of the liquid and the formula $$\frac{\pi \cdot (w^2 - z^2)}{4}$$

represents the active area on which this pressure acts, namely the area of the circular ring that forms between the sliding section 12, having a circular diameter section w, and the inner section of the slot 42, having a circular diameter section z.

In a radial direction, the pressurized liquid transmits a force $F_{rz}$ that acts radially along the diameter z and extension $c_z$ surface portion. For reasons of balance, the extent on the equivalent surface will be proportional to the ratio z/w.

By considerations of the dynamic balance of the system, the friction force $F_{rw}$ on sliding of the seal and of the pin 11 on the surfaces of the sliding section 12 is given by the relation:

$$F_{rw} = P_l \cdot \mu \cdot \frac{z}{w} \tag{7}$$

μ is the friction coefficient that, in the presence of dither vibrations, tends to be cancelled. In the light of the equation (7), it is appropriate that z is less than w and, in particular, that z is much less than w. In particular, the relation z/w between the diameter w of the sliding section 12 and of the diameter z of the slot 42 can vary from 1.4 to 2.

On the other hand, if the seal is installed on the guide hole, it is clear from the developed considerations that the friction force would be anyway much greater than the friction developed with the seat of the seal on the pin 11 and would not be affected directly by the dither effect.

From this, the advantage that arises from installing the seal to avoid leaks along the sliding surface of the pin 11 in a slot 42 obtained on the pin 11, and not in a slot obtained along the guide section 12 of the hollow body 10, is thus clear. In fact, if the seal were fitted in a slot of the guide section 12, the seal would exert a much greater pressure force and would cause greater friction force contrasting with sliding.

From what has been disclosed it is clear that the injector device 1 according to the invention achieves the set objects.

It is clear that the injector device 1 according to the invention is of modular type, with a specific axisymmetric geometry and specific axisymmetric self-adjusting forces and consists of two modular units with both said features:

the injection module 2 that includes the hollow housing body 10 and the pin element 11 and, the modular adjusting and control unit 3 with conical disc springs 72.

The injector device 1 operates according to a principle of adjusting the hydraulic pressure upstream of the nozzle 15 by a hydraulic narrowing 30 in a thin wall controlled by a passive self-adjusting system—i.e. devoid of adjusting systems activated by external energies—to variations of the flowrate around the presetting conditions.

Owing to the use of the injector device 1, the pressure variations of the reactive component, arising from the variation of the supply flowrate that flows inside the injector device 1, are minimized and cancelled in specific conditions.

This result is obtained by the passive self-adjusting system that is achieved synergically by the modular unit 2, including pin 11 and nozzle 15, and the modular adjusting and control unit 3e of the hydraulic narrowing 30.

The constructional geometric features of the injector device 1 make it possible to optimize the mixing efficiency through mixing by turbulence of the jets of reactive liquid component to be mixed in the mixing chamber 8. In fact, the constructional geometry characterised by only two pieces—a nozzle 15 and a pin 11—obtained by production techniques through rotation and revolution with main single placing permits perfect axial centring between the pin 11 and nozzle 15, such as to generate axial and axisymmetrical jets that are homogeneous in the radial development and centred towards the focal point where the jets clash and mix.

Also the forces that develop through the pressure of the liquids and the flow have features that are perfectly axisymmetric.

Also the adjusting and contrasting module 3 is made with devices that also have axisymmetric geometric features and development of the elastic reaction forces. Both the modules 2 and 3 are lastly provided with features that minimize the effects of sliding friction.

It is understood that what has been said and shown with reference to the attached drawings has been provided merely by way of illustrative example of the general features of the injector device according to the present invention; other modifications to or variations on the injector device or parties thereof can be made without thereby falling outside the scope of the claims.

In particular, the geometric conformation, dimensions, position, and materials that make up one or more of the parts of the injector device can be chosen and/or optimized suitably on the basis of specific use needs.

The invention claimed is:

1. Injector device for supplying a chemically reactive component to a mixing chamber of a mixing head and for presetting and adjusting the pressure of said reactive component upstream of said injector device, including a modular structure that is geometrically and functionally configured in an axisymmetric manner, including:

a hollow housing and guide body for a sliding partializing element, extending around an axis of longitudinal symmetry, in said hollow body at least one supply opening being obtained and a nozzle orifice arranged for facing and communicating with a mixing chamber obtained in said mixing head, said partializing and control element, having a pin shape with an end surface with a flat circular edge, that is housed and slidably movable—along said axis of longitudinal symmetry—in said hollow housing and guide body and configured to vary a narrowed active section of said nozzle orifice, said hollow body including a guide section of said partializing element, an inlet chamber for the reactive component, on which one of said supply openings is obtained, and an end accumulating conveying chamber for the reactive component, between said inlet chamber and said end conveying chamber a collar element being interposed with a turbulator function, on said partializing and control element a junction portion being obtained and a tang or tip end portion connected to said flat circular edge, shaped for receiving a pressure from the respective polymeric component delivered into said hollow body so as to move away said partializing and control element from said nozzle orifice to vary the area of said narrowed active section, a modular adjusting and contrasting unit, in an axisymmetric configuration, which is removably couplable with said hollow body and with said partializing and control element and configured to exert an axisymmetric thrust action on said partializing and control element, to set up the partializing and control element in an initial position and preload condition so as to adjust said narrowed active section to a reference flowrate and pressure of said polymeric component and subsequently to vary the position of said partializing and control element to adjust said narrowed active section according to the flowrate variation, exerting a contrasting force that is suitable for balancing the pressure exerted by said polymeric component, maintaining the variations thereof within limited values, wherein said modular adjusting and contrasting unit includes a series of stacked and interchangeable elastic elements of conical disc shape, configured to exert an elastic contrasting action such as to contain and limit the force variation arising from the retraction stroke of said partializing and control element, by limiting to a maximum the pressure variation as the flowrate of the respective polymeric component entering said hollow housing and guide body varies, said modular adjusting and contrasting unit, said tip portion with a border having a flat circular edge and said nozzle orifice cooperating mutually to impart to said injector device an axisymmetric geometric conformation with a high section gain, corresponding to a high ratio between the variation of the area of narrowed active section and the longitudinal position shift or variation of said partializing and control element.

2. Injector device according to claim 1, wherein said tip portion with a flat circular edge is connected to said junction portion by a connecting portion of frustoconical shape and is configured to penetrate inside or move away from said nozzle orifice along said axis of longitudinal symmetry, so as to prevent or permit the flow of the reactive component into said mixing chamber by adjusting the pressure of the reactive component upstream of said injector device.

3. Injector device according to claim 2, wherein said nozzle orifice is obtained on a bottom of said hollow body and is bounded, inside said hollow body, by tilted surfaces, said nozzle orifice including a transit section bounded by a cylindrical surface of diameter and of length configured to interact with and contain said tip portion of said partializing element and an outlet section for the reactive component to exit to said mixing chamber, said outlet section being of frustoconical shape and defined by divergent tilted surfaces that widen towards said mixing chamber.

4. Injector device according to claim 3, wherein the ratio between the value of the length and the value of the diameter of said transit section of said orifice has a value included between 0.1 to 0.7.

5. Injector device according to claim 3, wherein the ratio between the value of the length and the value of the diameter of said transit section of said orifice has a value included between 0.1 and 0.5, and is bounded by said tilted surfaces such that said nozzle orifice is configured into a "thin-wall", so as not to influence the efficiency and the turbulence of the jet of reactive component exiting said narrowed section and ensure the necessary mechanical robustness for said bottom.

6. Injector device according to claim 3, wherein said surface of said transit section of said nozzle orifice and the surface of said guide section of said pin are obtainable by turning and grinding machining techniques by revolution with a single machine placement so as to ensure centring between said tip portion of said partializing and control element and said surface of said nozzle orifice and the axial symmetry of the jet that is generated by the flow of the reactive liquid component inside said injector device.

7. Injector device according to claim 1, wherein said flat circular edge of said end surface has a smaller diameter than the diameter of the section of said nozzle orifice, so as to form a clearance space between said tip portion and said nozzle orifice when said tip portion is inserted inside said nozzle orifice.

8. Injector device according to claim 7, wherein said clearance has a value included between 1.5% and 10% of the diameter of said nozzle orifice.

9. Injector device according to claim 7, wherein said clearance has a value included between 2% and 7% of the diameter, so as to have a high section gain, corresponding to a high ratio between the variation of the area of the narrowed active section and the longitudinal shift of said partializing and control element.

10. Injector device according to claim 1, wherein said tip portion with a flat circular edge is of cylindrical shape.

11. Injector device according to claim 1, wherein at least two of said supply openings are provided, and wherein said supply openings are obtained with the same shape and arranged according to a symmetrical radial distribution, to supply the flow of reactive liquid component according to an axially homogeneous distribution.

12. Injector device according to claim 1, wherein on said partializing element said collar turbolator ridge is obtained that is configured to induce acceleration and turbulence in the flow of the respective reactive component so as to generate vein detachment vortices on the underflow surface, so as to induce a dither effect suitable for reducing as far as cancelling the first detachment friction on said partializing element.

13. Injector device according to claim 12, wherein said collar turbolator ridge is positioned between said one or more supply openings of said inlet chamber and said end conveying chamber at a section narrowing of said inlet chamber, on said turbulator ridge at least one lower border with a sharp edge being obtained that is conformed to accentuate the turbulence and detachment effect of the fluid vein inducing vortices in the flow downstream and generating a variable thrust force, pulsing at high frequency, so as to cancel the friction of, and the effect of shift hysteresis on, said partializing and control element.

14. Injector device according to claim 12, wherein on said partializing element a collar turbulator ridge is obtained configured with an overflow surface with a frustoconical peripheral surface shape, to induce acceleration and speed on said frustoconical surface of the flow of the respective reactive liquid component, so as to generate an axisymmetric thrust so as to draw back the partializing element through a Venturi effect in function of the speed of the flow flowing therein.

15. Injector device according to claim 12, wherein said collar turbulator ridge is bounded externally by a peripheral surface with a trapezoid section with at least the upper surface tilted with respect to the direction of the flow to induce a speed increase and a pressure reduction effect on said surface.

16. Injector device according to claim 12, wherein said collar turbulator ridge is bounded externally by a peripheral surface consisting of two frustoconical half-surfaces that are mirrored with respect to a plane that is orthogonal to said axis of longitudinal symmetry.

17. Injector device according to claim 12, wherein said collar turbulator ridge is bounded externally by a cylindrical peripheral surface.

18. Injector device according to claim 12, wherein said conveying end chamber, positioned between said turbulator ridge and said orifice, is configured to receive and guide the reactive liquid component to said orifice, said end chamber being of frustoconical shape and being bounded by tilted surfaces that converge on said orifice.

19. Injector device according to claim 18, wherein said tilted surfaces are configured with an angular opening (α) included between 140° and 170°.

20. Injector device according to claim 18, wherein said tilted surfaces are configured with an angular opening included between 145° and 160°, in order to generate on the partializing element an axisymmetric thrust that is suitable for retracting in function of the speed of the flow, to minimize the dissipating effects on the reactive component in said end chamber, and ensure the appropriate symmetry and turbulence to the jet of the reactive component when it is delivered into said mixing chamber.

21. Injector device according to claim 1, wherein said interchangeable conical disc elastic elements, including conical disc elements, are geometrically configured to exert an axisymmetric elastic action devoid of radial components and to be mutually in contact with respective point zones so as to be free of hysteresis phenomena by reciprocal rubbing.

22. Injector device according to claim 1, wherein said elastic elements of conical disc shape are assembled in series to form a pile, configured to exert said elastic action on a spacer connected in thrust with a rear portion of said partializing and control element.

23. Injector device according to claim 22, wherein said rear portion of said partializing and control element is inserted into a centring hole obtained on said spacer, so as to centre in thrust said modular adjusting and contrasting unit to said hollow body and to said partializing and control element.

24. Injector device according to claim 22, wherein said modular unit includes a presetting element for the deflection of said pile of said conical disc elastic elements, connected above to said pile of said conical disc elastic elements, on the opposite side with respect to said spacer, configured to compress said conical disc elastic elements so as to provide a determined preset elastic action that corresponds to the value that generates the nominal pressure on the inlet section of the injector device at the nominal flowrate.

25. Injector device according to claim 1, wherein the overall elastic constant value of said pile of said conical disc elastic elements varies between 80 N/mm and 250 N/mm, with an elastic stiffness coefficient decreasing as a function of the deflection.

26. Injector device according to claim 1, wherein the overall elastic constant value of said pile of said conical disc elastic elements varies between 100 N/mm and 170 N/mm, with an elastic stiffness coefficient decreasing as a function of the deflection.

27. Injector device according to claim 1, wherein said pile is inserted into a housing body on which a first and a second thread are obtained, said first inner thread being configured to seal said modular adjusting and contrasting unit to said hollow body with axisymmetric centring coupled by an end section of cylindrical shape, said second thread being configured to fix said modular unit to said mixing head.

28. Injector device according to claim 1, wherein said hollow body is obtained as a single piece.

29. Injector device according to claim 1, wherein the inner surfaces of said inlet chamber, of said conveying chamber, of said nozzle orifice and of said guide section are obtained by turning operations with a single placement on a machine tool, so as to obtain perfect concentricity between said guide section, between the surfaces bounding said chambers and said nozzle orifice.

30. Injector device according to claim 1, wherein said guide section is of cylindrical shape, has a height and a diameter, and wherein the ratio is greater than 1.

31. Injector device according to claim 1, wherein an annular seal element is arranged inside annular slots of diameter obtained along a sliding and guide cylindrical portion of said partializing element, to avoid leaks of reactive liquid component along the surface of said guide section of diameter, wherein the ratio between said inner diameter of said annular slots and said diameter of said guide section has a variable value from 1.4 to 2.

32. Injector device according to claim 31, wherein said annular seal element rests on an annular element made of a material with a low friction coefficient positioned on the surface of said guide section at said annular seal element.

33. Method for supplying a chemically reactive component to a mixing chamber of a mixing head and for presetting and regulating the pressure of the reactive component upstream of an injector device by a modular structure, included in said injector device and that is geometrically and functionally configured in an axisymmetric manner, said method including the steps of:
  a) providing a hollow body extending around a longitudinal symmetry axis and wherein there are obtained at least one supply opening and a nozzle orifice arranged for facing and communicating with said mixing chamber obtained in said mixing head,
  b) housing and guiding a partializing and control element slidable within said hollow body along said longitudinal symmetry axis, wherein said partializing element is configured with a pin shape and includes a tip or tang portion on which a flat circular edge is obtained that is configured to vary a narrowed active section of said nozzle orifice,
  c) conforming said hollow body with an inlet chamber for the reactive component, on which at least one said supply opening is obtained, and an accumulating conveying end chamber for the reactive component is obtained,
  d) interposing between said inlet chamber and said end conveying chamber a collar element with a turbulator function,
  e) conforming said partializing and control element with a connection portion and a tip end portion with a flat end circular edge conformed for receiving pressure from the respective polymeric component delivered into said hollow body so as to move away said partializing and control element from said nozzle orifice to vary the area of said narrowed active section,
  f) applying a modular adjusting and contrasting unit, in an axisymmetric configuration, which is removably couplable with said hollow body and with said partializing and control element, said modular adjusting and contrasting unit being configured to exert an axisymmetric thrust action on said partializing and control element, being suitable for setting up said partializing and control element in an initial position and preload condition so as to adjust said narrowed active section to a reference flowrate and pressure of the reactive component and, subsequently, to vary the position of said partializing and control element so as to adjust said narrowed active section as a function of the flowrate variation, exerting a contrasting force that is suitable for balancing the thrust exerted by the pressure of the polymeric component, maintaining the variations of the pressure within limited values, g) conforming said modular adjusting and contrasting unit, including a series of piled and interchangeable elastic elements of conical disc shape, to perform a contrasting elastic action so as to contain and limit the force variation arising from the retraction stroke of said partializing and control element, limiting the pressure variation as much as possible as the flowrate of the respective polymeric component entering said hollow housing and guide body varies, h) configuring said modular adjusting and contrasting unit, with said tip portion with said flat circular edge and said nozzle orifice so that they impart to said injector device an axisymmetric geometric conformation with a high section gain, corresponding to a high ratio between the variation of the area of the narrowed active section and the shift or variation of longitudinal position of said partializing and control element.

34. Method according to claim 33, wherein there is provided configuring said injector device so as to obtain a high gain ratio between the axial shift of said tip portion with a flat circular edge of said pin partializing and control element and the section of said thin-wall narrowed active section of frustoconical shape defined between said flat circular edge and a circular edge of said nozzle orifice by a constructional clearance.

35. Method according to claim 33, wherein the sliding friction components of said partializing and control pin element along the surface of a guide section of said partializing and control element obtained on said hollow body are reduced and cancelled, said friction components being axial pulsating forces induced by vein detachment turbulence through the dither effect originating from turbulence along said collar element interposed in a narrowing between said end conveying chamber and said inlet chamber.

36. Method according to claim 33, wherein it is provided to reset or increase the pressure of the reactive component supplied to said injector device measured at the inlet of the supply channel to said injector device on said mixing head, when the flowrate falls beyond 30% of the nominal flowrate wherein the reset or an increase of said pressure is obtained by integration of the opening axial thrust generated, during the pressure presetting step at the nominal flowrate, by the pressure of the reactive component, in addition the integration, function of the flowing flowrate, obtained by a turbulator ridge with an above flow tilted surface, by converging surfaces of said end conveying chamber and by the contribution of the residual pressure downstream of said narrowed active section that acts on the surface in the recirculating and mixing step.

37. Method according to claim 36, wherein the pressure of the reactive component supplied to said injector device is increased, the pressure being measured at the inlet of the supply channel of said injector device installed on said mixing head, by integration of the opening axial thrust generated by the pressure of said reactive component by the contribution of the residual pressure downstream of said variable narrowing that acts on the end surface in the recirculating and mixing step, in particular when the ratio between the surface of said nozzle orifice and that of said sliding section is greater than or the same as 6/49.

38. Method according to claim 33, wherein the elastic stiffness of the pile of said conical disc elastic elements is modified and set by changing the configuration of the springs with different outer diameters and thicknesses.

39. Method according to claim 33, wherein said partializing and control element and said hollow body of said injector device are obtained in a single piece by turning and by subsequent grinding, with a single machine-placement that ensures rotation thereof around the positioning axis for all machining tasks relating to the sliding surfaces of said pin and relating to said edges that form said thin-wall narrowing, so as to ensure the perfect axial symmetry to generate a jet of reactive liquid component downstream of said nozzle orifice with an axisymmetric profile.

* * * * *